United States Patent [19]
Suzuki et al.

[11] Patent Number: 6,050,238
[45] Date of Patent: Apr. 18, 2000

[54] CONTROL SYSTEM FOR INTERNAL COMBUSTION ENGINE

[75] Inventors: Keisuke Suzuki, Kanagawa; Nobutaka Takahashi, Yokohama; Takeaki Obata, Kanagawa, all of Japan

[73] Assignee: Nissan Motor Co., Ltd., Yokohama, Japan

[21] Appl. No.: 09/110,413

[22] Filed: Jul. 6, 1998

[30] Foreign Application Priority Data

Jul. 4, 1997 [JP] Japan .................................. 9-179651
Dec. 19, 1997 [JP] Japan .................................. 9-351530

[51] Int. Cl.$^7$ .................................................. F02B 17/00
[52] U.S. Cl. ........................................... 123/295; 123/305
[58] Field of Search .................................. 123/295, 305, 123/436

[56] References Cited

U.S. PATENT DOCUMENTS

| | | | |
|---|---|---|---|
| 5,722,362 | 3/1998 | Takano et al. | 123/295 |
| 5,878,366 | 3/1999 | Schricker et al. | 123/436 |
| 5,881,693 | 3/1999 | Mizno | 123/295 |
| 5,884,602 | 3/1999 | Friedrick et al. | 123/305 |
| 5,894,827 | 4/1999 | Kamura et al. | 123/305 |

*Primary Examiner*—John Kwon
*Attorney, Agent, or Firm*—Foley & Lardner

[57] ABSTRACT

When an air conditioner is turned on during homogeneous operation, an equivalence ratio correction factor $\Delta \phi$ is increased sharply and suddenly in such a manner as to show a jump for thereby increasing an engine output torque, and thereafter is decreased gradually with increase of a cylinder intake air quantity, whereby to maintain the engine output torque constant. However, when switching to a homogeneous mode occurs in the middle of the above control, switching to proper torque correction is not carried out at the time of a homogeneous combustion mode, i.e., torque correction by the use of ignition timing but the torque correction by the equivalence ratio correction factor $\Delta \phi$ continuously. By this, in contrast to the case in which the torque correction is switched to one that is carried out by the use of ignition timing correction quantity, a sharp and sudden variation of engine output torque can be prevented. In the meantime, after completion of the torque correction by the above mentioned control, the torque correction at the time of the homogeneous combustion mode is carried out by ignition timing correction. Further, when the combustion mode is switched to stratified combustion during execution of torque correction by ignition timing correction at the time of the homogeneous combustion mode, the torque correction is switched to one that is carried out by the use of the equivalence ratio correction factor simultaneously with switching of the combustion mode.

14 Claims, 24 Drawing Sheets

EQUIVALENCE RATIO-IGNITION TIMING
TRANSLATION TABLE

CONTROL SYSTEM FOR INTERNAL COMBUSTION ENGINE

CROSS-REFERENCE TO RELATED APPLICATIONS

This application claims the priority of JP 9-179651 filed Jul. 4, 1997, and JP 9351530 filed Dec. 19, 1997.

BACKGROUND OF THE INVENTION

1. Field of the Invention

The present invention relates to a control system for an internal combustion engine capable of switching combustion modes which are different in injection timing, such as a homogeneous combustion mode and a stratified combustion mode, while performing quick-response torque correction by using different manipulated variables according to the combustion modes.

2. Description of the Related Art

For stabilization control of engine speed at idling, load compensation control, and torque control for meeting various requests during running, it has heretofore been practiced to perform torque correction by using manipulated variables which are higher in responsiveness than intake air quantity. Such torque correction is herein referred to as "quick-response torque correction".

On the other hand, in recent years direct-injection spark ignition internal combustion engines have attracted public attention. Typical one of such engines performs, in accordance with an engine operating condition, switching of two combustion modes, i.e., a homogeneous combustion mode in which fuel is injected during intake stroke and is dispersed within a combustion chamber to form a homogeneous mixture, and a stratified combustion mode in which fuel is injected during compression stroke to form a stratified mixture which is concentrated around a spark plug, as disclosed in Japanese patent provisional publication No. 59-37236.

SUMMARY OF THE INVENTION

In such a direct-injection spark ignition internal combustion engine, the above described quick-response torque correction may be performed by using as a manipulated variable or variables at least ignition timing during homogenous operation and equivalence ratio during stratified operation. The calculation of the manipulated variable is performed by being synchronized with crank angle (Ref Job), and the calculation of judgement on the request for the combustion mode is performed by being synchronized with time (e.g., 10 ms). This is because in case of the former the idle speed is detected on the basis of a time interval between Ref signals so as to be reflected on the ignition timing immediately after the detection or the fuel injection quantity during stratified operation, and in case of the latter the calculation synchronous with crank angle causes a large calculation load but if the angular interval for the angle synchronization is expanded for making lower the calculation load the interval of the combustion mode switching judgement becomes so large as to disable rapid switching of the combustion modes.

For example, a combustion mode is requested on the basis of a combustion mode request flag (FSTRR) calculated at the interval of 10 ms, and by Ref Job a manipulated variable (ignition timing or equivalence ratio) for quick-response torque correction is requested on the basis of the combustion mode request flag (FSTRR) at that moment.

However, in such a request system for a manipulated variable for torque correction, in case of switching from a stratified combustion mode to a homogeneous combustion mode and in case the flag (FSTRR) is switched between the fuel injection timing and the Ref signal output timing during homogeneous operation of a certain cylinder (#3 cylinder in FIG. 26), the fuel injection timing during homogeneous operation of #3 cylinder has already been past so stratified operation must be performed at #3 cylinder and therefore switching to a homogeneous combustion mode starts from #4 cylinder. However, at the time when the Ref signal for #3 cylinder is produced, the flag (FSTRR) has already been switched to request a homogeneous combustion mode, so the quick-response manipulated variable has already been switched from equivalence ratio to ignition timing. As a result, the ignition timing is corrected though stratified operation is actually carried out, causing deterioration of combustion and in the worst case a possibility of misfire.

Further, in case of switching from a homogeneous combustion mode to a stratified combustion mode and in case the flag (FSTRR) is switched after fuel injection for homogeneous operation has been carried out at a certain cylinder (e.g., #1 cylinder in FIG. 27) and before the Ref signal for that cylinder rises, homogeneous operation is performed at #1 cylinder since fuel injection for homogeneous operation has already been finished. However, since the flag (FSTRR) has already been switched to request a stratified combustion mode at the time when the Ref signal for #1 cylinder is produced, the quick-response manipulated variable is switched from ignition timing to equivalence ratio. In this instance, correction by equivalence ratio is not performed since fuel injection has already been finished. As a result, quick-response torque correction is not reflected on combustion at #1 cylinder.

The quick-response torque control encounters another problem as follows. When a combustion mode is switched from a stratified combustion mode to a homogeneous combustion mode during execution of quick-response torque control by the use of equivalence ratio at the time of stratified operation, a portion of correction executed by equivalence ratio is converted to a correction value by the use of ignition timing so as to carry out correction by ignition timing. In this connection, it is impossible for the reason of the capacity of ROM to prepare equivalence ratio/ignition timing translation tables for a number of operating conditions. When, for the above reason, the tables are reduced in number considerably for the purpose of reducing the capacity of ROM or an arithmetic expression is used to carry out the conversion, the accuracy of torque control at the time of conversion of equivalence ratio/ignition timing is lowered.

For example, FIG. 25 shows an equivalence ratio correction factor/ignition timing correction quantity translation table which is prepared by the use of a torque correction factor/equivalence ratio correction factor translation table shown in FIG. 8 and a torque correction factor/ignition timing correction quantity translation table shown in FIG. 9. In the table of FIG. 25, an actual characteristic may diverge from the solid line curve as indicated by a dotted line curve.

For this reason, a variation of the torque correction factor attained by the use of equivalence ratio at the time of stratified operation and a variation of the torque correction factor attained by the use of ignition timing which is employed in place of equivalence ratio after switching to a homogeneous combustion mode, when regarded as torque value, are not always smoothly consecutive with each other, thus causing a possibility that a jump or sharp drop is caused in variation of torque when a manipulated variable is switched from equivalence ratio to ignition timing.

According to a first aspect of the present invention, there is provided an internal combustion engine, comprising: a first cylinder; a second cylinder; and a controller. The controller comprises a mode requesting section for requesting one of a first combustion mode and a second combustion mode for each of the cylinders, the second combustion mode being later in a fuel injection timing than the first combustion mode; a mode judging section for judging whether an actual combustion mode of each of the cylinders is the first combustion mode or the second combustion mode; a torque requesting section for generating a torque correction request signal for a torque correction according to operation of the engine; and a torque correction section for performing torque correction for each of the cylinders, in response to the torque correction request signal and to the combustion mode of each of the cylinders, by manipulating different manipulated variables in the respective first and second combustion modes.

By the first aspect of the present invention, after one of the combustion modes is requested, a cylinder would be transitionally maintained at the same combustion mode as that before the request, switching of the actual combustion mode starts from the cylinder which becomes capable of executing combustion according to the combustion mode after the request.

In this connection, when a request for switching of the combustion modes is produced under the condition where torque correction according to an operating condition of the engine is executed, a cylinder whose combustion just after the request is executed according to a combustion mode before the request is subjected to torque correction by using a manipulated variable according to the combustion mode before the request. Then, the cylinder is subjected to torque correction by using a manipulated variable according to the combustion mode after the request starts from a cylinder which executes combustion which is switched according to the combustion mode after the request.

Accordingly, it is possible to attain torque correction according to an actual combustion mode and therefore a suitable torque correction can be executed to maintain a good driving condition.

According to a second aspect of the present invention, there is provided a control system for an internal combustion engine, comprising: a mode selecting section for selecting one of a first combustion mode and a second combustion mode for each of cylinders of the engine, the second combustion mode being later in a fuel injection timing than the first combustion mode; a torque correction requesting section for generating a torque correction requesting signal for a torque correction according to operation of the engine; a variable selecting section for selecting a manipulated variable according to whether the combustion mode is charged from the first combustion mode to the second combustion mode or from the second combustion mode to the first combustion mode; a torque correction section for performing torque correction for each of the cylinders, in response to the torque correction request signal and to the manipulated variable selected by the variable selecting section.

By the second aspect of the present invention, the following effects are obtained.

If a different manipulated variable is used for manipulation of torque correction, there may possibly be caused a variation in a correction quantity for the same torque correction work. Accordingly, when the manipulated variable for torque correction is switched in response to switching of the combustion mode during execution of the torque correction, there may possibly be caused a jump or sharp drop in the variation of torque. Accordingly, in such a case, it is desirable to delay switching of the manipulated variable until the torque correction in progress is finished even when the combustion mode is switched. However, in case it is actually impossible to carry out, by using the manipulated variable for torque correction before switching of the combustion mode, torque correction after switching of the combustion mode from a point of view of combustion characteristics or the like, the manipulated variable must be switched in response to switching of the combustion mode.

As against the fact that the second combustion mode, e.g. the stratified combustion mode, has only a restricted number of manipulated variable for torque correction, the first combustion mode, e.g. the homogeneous combustion mode, can use, in addition to the most desirable manipulated variable for torque correction, the manipulated variables for torque correction in the second combustion mode. Accordingly, a jump or sharp drop in variation of torque can be avoided, in case it is requested switching to the first combustion mode during execution of torque correction at the time of the second combustion mode, by performing torque correction by using the manipulated variable for torque correction in the second combustion mode until the torque correction in progress is finished.

On the other hand, when it is requested switching to the second combustion mode during execution of torque correction in the first combustion mode, switching of the combustion mode can be attained without any obstacle such as deteriorated combustion properties by switching the manipulated variable to one that is for correction in the second combustion mode, at the same time with switching of the combustion mode.

The above structures of the present invention can solve the above noted problems inherent in the prior art devices.

It is accordingly an object of the present invention to provide a novel and improved control system for an internal combustion engine which is capable of switching manipulated variables for correction of torque in response to switching of actual combustion modes.

It is another object of the present invention to provide a novel and improved control system for an internal combustion engine which can prevent a jump or sharp drop in variation of torque even when request for switching of a combustion mode occurs during execution of torque correction.

DETAILED DESCRIPTION OF THE PREFERRED EMBODIMENTS

Figure 1:
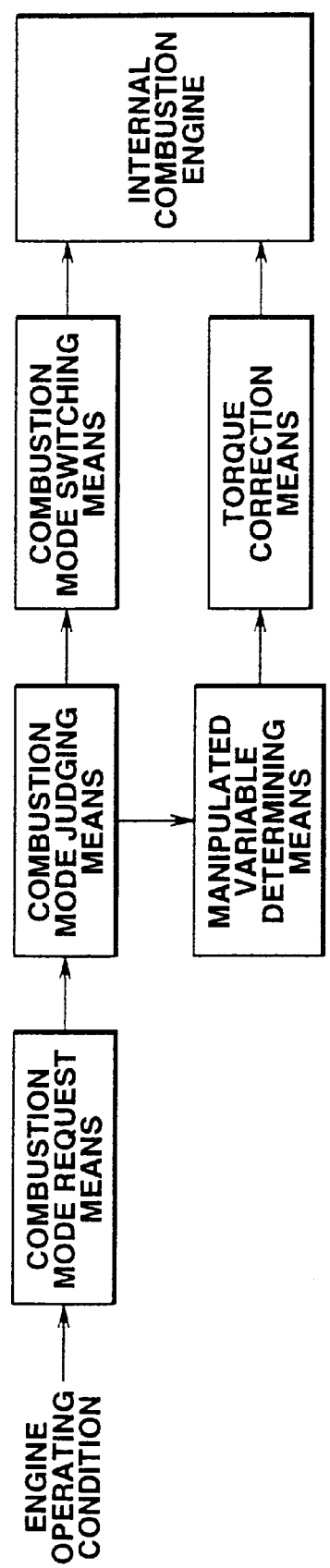
FIG. 1 is a block diagram of control system for an internal combustion engine according to the first embodiment of the present invention.

FIG. 1 shows a control system according to the first embodiment of the present invention. As illustrated, in an internal combustion engine having in an internal combustion engine having combustion mode switching means for switching a combustion mode from one of a first combustion mode and a second combustion mode to the other, the second combustion mode being later in a fuel injection timing than the first combustion mode, and torque correction means for performing torque correction which is requested according to an operating condition of the engine, by using different manipulated variables in the respective first and second combustion modes, the control system comprises combustion mode request means for requesting one of the first and second combustion modes according to an operating condition of the engine, combustion mode judging means for judging an actual combustion mode of each cylinder on the basis of a combustion mode requested by the combustion mode request means and a timing at which a combustion mode is switched as requested, and manipulated variable determining means for determining a manipulated variable for torque correction according to a combustion mode which is judged by the combustion mode judging means.

Figure 2:
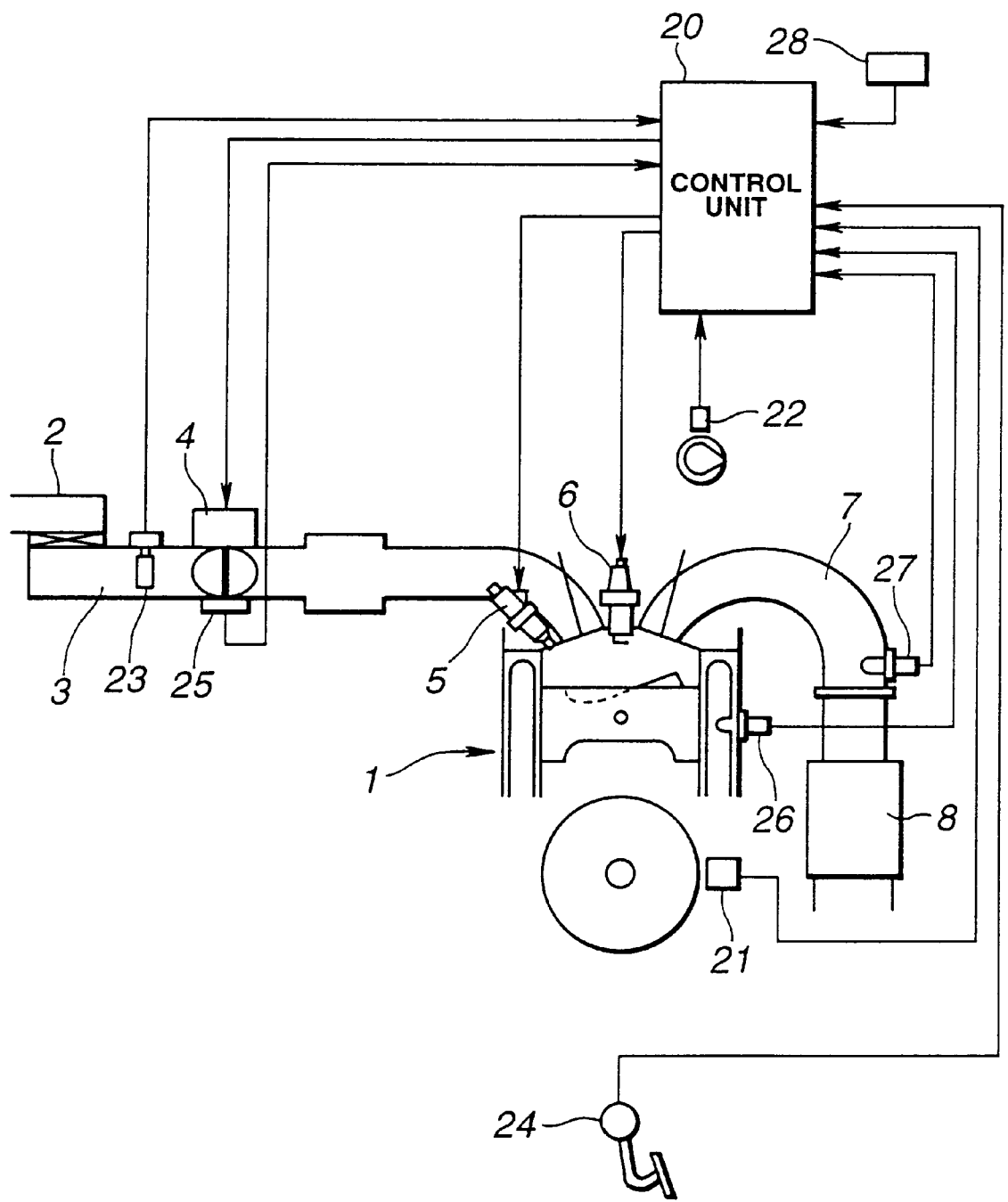
FIG. 2 is a schematic view of an internal combustion engine in which the present invention is embodied.

FIG. 2 shows an internal combustion engine in which the control system of the present invention is embodied.

Referring to FIG. 2, air is supplied to a combustion chamber of each cylinder of an internal combustion engine 1 installed on a vehicle, from an air cleaner through an intake passage 3 and under control of an electronically controlled throttle valve 4.

The electronically controlled throttle valve 4 is controlled by a step motor or the like which is operated in accordance with a signal from a control unit 20, to vary its opening.

An electromagnetic type injection valve (injector) 5 is provided for injecting fuel (gasoline) directly into the combustion chamber.

The fuel injection valve 5 opens and injects fuel the pressure of which is regulated to a predetermined value, when its solenoid is energized in response to an injection pulse signal generated by the control unit 20 during the intake stroke or compression stroke in timed relation to an operation of the engine. The injected fuel spreads over the inside of the combustion chamber to form a homogeneous mixture in case of injection during the intake stroke. In case of injection during the compression stroke, the injected fuel forms a stratified mixture concentrating around a spark plug 6. In accordance with an ignition signal from the control unit 20, the injected fuel is ignited to combust (perform homogeneous combustion or stratified combustion). In the meantime, the combustion modes can be classified to, when combined with an air/fuel control, a homogeneous/stoichometric combustion mode, homogeneous/lean combustion mode (air/fuel ratio from 20:1 to 30:1), and stratified/lean combustion mode (air/fuel ratio of about 40:1).

The exhaust gas from the engine 1 is discharged through an exhaust passage 7, and a catalyst 8 for exhaust gas purification is provided to the exhaust passage 7.

The control unit 20 has a microcomputer which consists of CPU, ROM, RAM, A/D converter, input/output interface, etc. Signals from various sensors are supplied to the control unit 20.

Provided as such sensors are crank angle sensors 21 and 22 for detecting a rotation of a crankshaft and camshaft. The crank angle sensors 21 and 22 generate reference pulse signals REF every crank angle of 720°/n where n is the number of cylinders of the engine 1 and when the crankshaft and camshaft assume a predetermined crank angle position (a predetermined crank angle position before a compression upper dead position in each cylinder), while generating a unit pulse signal POS every crank angle of 1~2, whereby engine speed Ne can be calculated by the use of a cycle of the reference pulse signal REF.

Further, there are provided an airflow meter 23 at the intake passage 3 upstream of the throttle valve 4 for detecting an intake air quantity Qa, an acceleration sensor 24 for detecting an accelerator opening (amount of depression of accelerator pedal), throttle sensor 25 for detecting an opening TVO of a throttle valve 4 (an idle switch which is turned ON when the throttle valve 4 is put into a fully closed position, is included), a coolant temperature sensor 26 for detecting a coolant temperature Tw of the engine 1, oxygen sensor 27 for generating a signal according to an exhaust air/fuel ratio (i.e., rich/lean state of the exhaust gas) at the exhaust passage 7, and a vehicle speed sensor 28 for detecting a vehicle speed VSP.

In this instance, the control unit 20 receives signals from the above described various sensors and performs a predetermined calculating process by means of the built-in microcomputer, whereby to control the throttle opening by the electronically controlled throttle valve 4, the fuel injection quantity and the fuel injection timing by the fuel injection valve 5, and the ignition timing by the spark plug 6.

Then, referring to FIGS. 3 to 7, various control routines for use in the control system of the first embodiment will be described.

Figure 3:
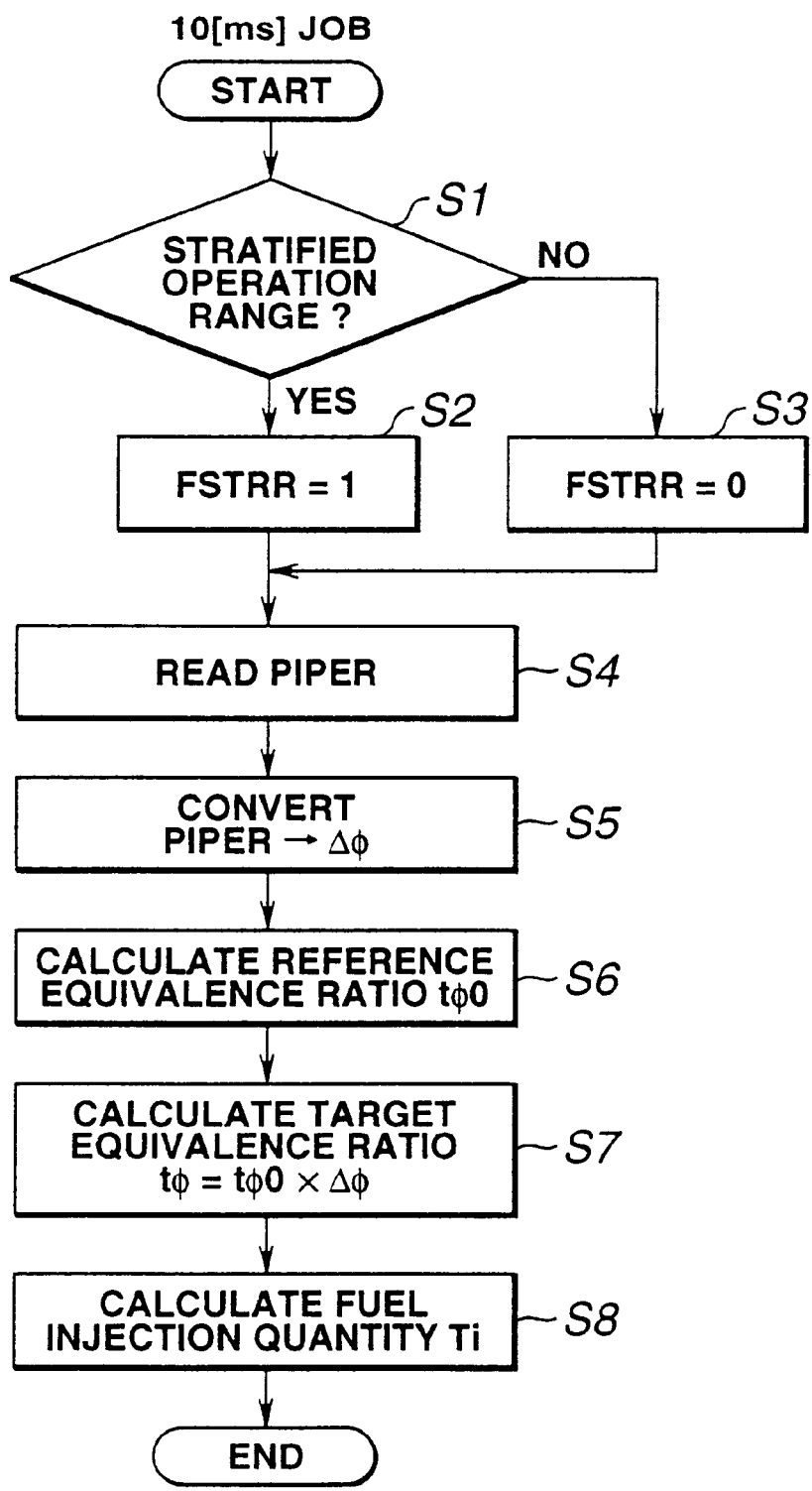
FIG. 3 is a flowchart of a routine for calculation of a fuel injection quantity for use in the control system of the first

FIG. 3 shows a fuel injection quantity calculating routine. This routine is executed at the interval of, for example, 10 ms.

At step S1, it is judged that which one of a homogeneous combustion mode and a stratified combustion mode is requested. In this connection, a combustion mode is requested by another routine constituting a combustion mode request means, on the basis of an engine operating condition and by making a reference to a combustion mode switching map.

When it is judged at step S1 that the requested combustion mode is stratified, the control proceeds to step S2 where a combustion mode request flag FSTRR is set to "1". When it is judged at step S1 that the requested combustion mode is homogeneous, the control proceeds to step S3 where the flag FSTRR is set to "0". Thereafter, the control proceeds from the respective steps to step S4.

At step S4, a torque correction factor PIPER which serves as a quick-response correction quantity is read. In this connection, the torque correction factor PIPER is a correction factor of a torque which is obtained according to a delayed cylinder intake air quantity dQa which is an actual cylinder intake air quantity and a target equivalence ratio t$\phi$, relative to a target torque which is obtained according to a target cylinder intake air quantity tQa and a target torque t$\phi$. Accordingly, as the actual torque becomes closer to the target torque by an equivalence ratio correction and an ignition timing correction made in response to request of torque correction which will be described hereinlater, the torque correction factor PIPER becomes smaller.

Figure 8:
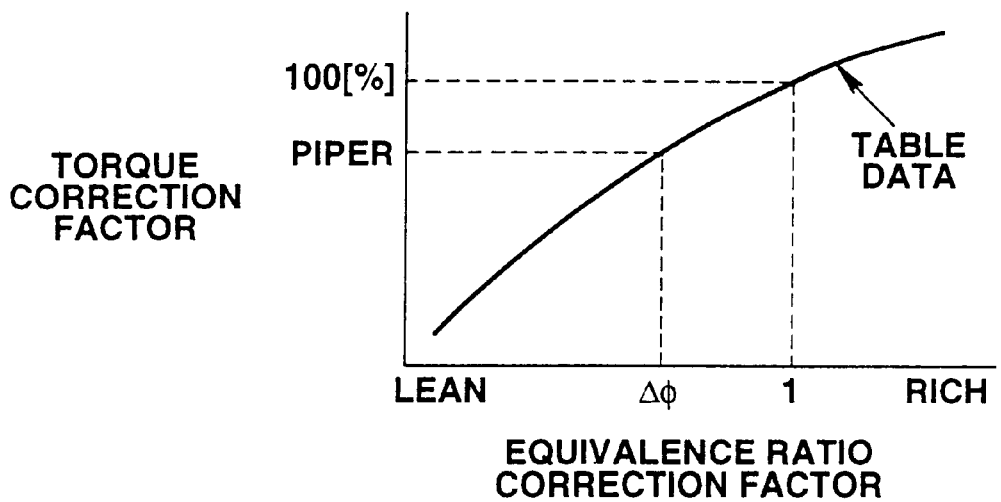
FIG. 8 is a graph illustrating a torque correction factor/equivalence ratio correction factor translation table for use in the first embodiment.

At step S5, the equivalence ratio correction factor $\Delta\phi 0$ is calculated by retrieval from the torque correction ratio/equivalence ratio correction factor translation table shown in FIG. 8.

At step S6, a reference equivalence ratio t$\phi 0$ is calculated by retrieval from a map table or the like on the basis of, for example, target torque and engine speed.

At step S7, the target equivalence ratio is calculated from the following expression.

$$t\phi = t\phi 0 \times \Delta\phi$$

At step S8, a fuel injection quantity Ti is calculated on the basis of the above described target equivalence ratio.

Figure 4:
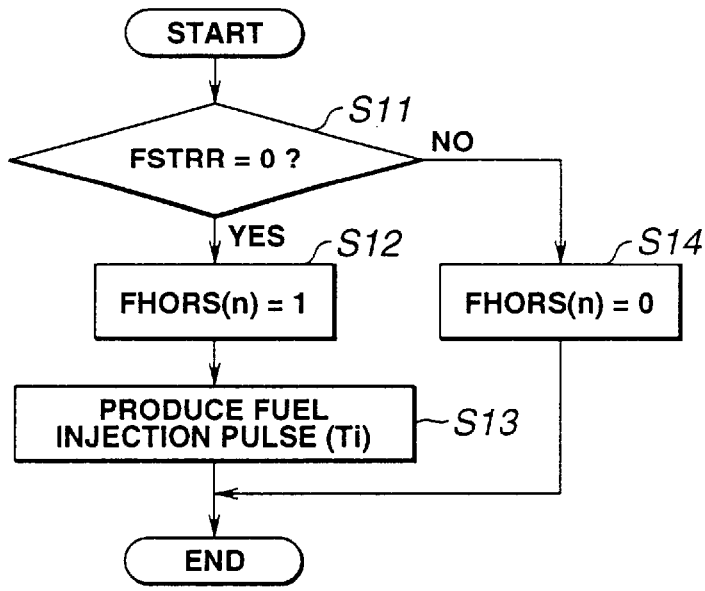
FIG. 4 is a flowchart of a routine executed at the fuel injection timing during homogeneous operation at each cylinder, for use in the first embodiment.

FIG. 4 shows a routine executed at the fuel injection timing (during intake stroke) during homogeneous operation of each cylinder (No. n cylinder).

At step S11, it is judged that the value of the above described combustion mode request flag FSTRR is "0". When the flag FSTRR is "0", i.e., when a homogeneous combustion mode is requested, the control proceeds to step S12 where a combustion mode judging flag FHORS(n) indicative of a combustion mode to be actually carried out at the No. n cylinder this time is set to "1" (homogeneous operation), and then to step S13 where it is produced an injection pulse signal equivalent to the fuel injection quantity Ti calculated by the routine shown in FIG. 3, whereby to carry out homogeneous operation.

Further, when at step S11 the value of the flag FSTRR is "0", i.e., when a stratified combustion mode is requested, the control proceeds to step S14 where the above described combustion mode judging flag FHORS(n) is set to "0" (homogeneous combustion mode), and thereafter the routine is ended.

Figure 5:
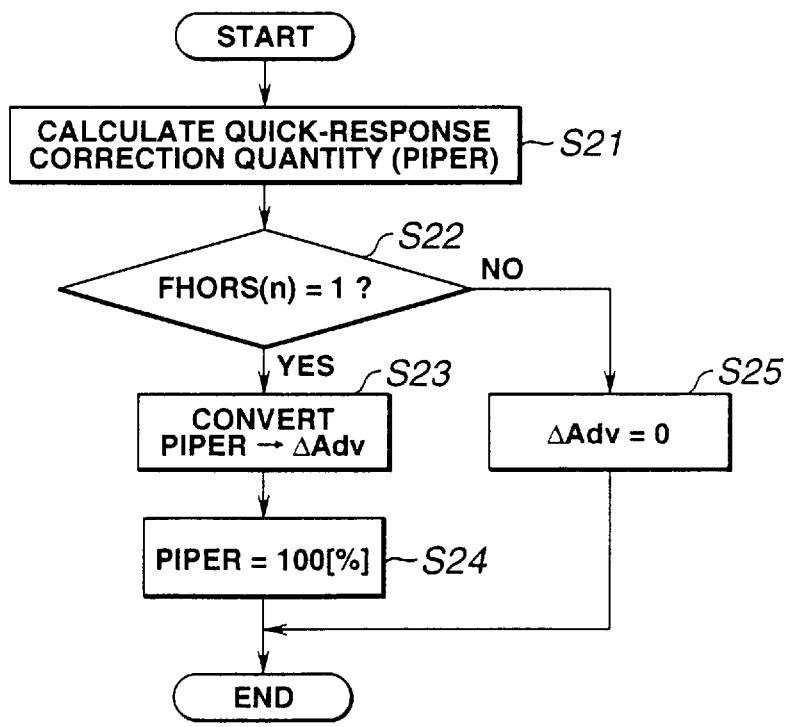
FIG. 5 is a flowchart of a routine executed at the time of output of a Ref signal at each cylinder, for use in the first embodiment.

FIG. 5 shows a routine executed at the time of output of a Ref signal at each cylinder (No. n cylinder). In this connection, the Ref signal is produced at the time between the fuel injection timing during homogeneous operation and the fuel injection timing during stratified operation of the corresponding cylinder.

At step S21, a torque correction factor PIPER which serves as a quick-response torque correction quantity is calculated.

At step S22, the value of the above described combustion mode judging flag FHORS (n) is judged. When the value of the flag FHORS (n) is "1", i.e., when the combustion mode of the No. n cylinder at this time is judged as homogeneous, the control proceeds to step S23 where an ignition timing correction quantity $\Delta$ Adv is calculated by retrieval from a torque correction factor/ignition timing correction quantity translation table and then proceeds to step S24 where the above described torque correction factor PIPER is reset to 100%. That is, the torque correction is carried out by ignition timing only and the equivalence ratio correction factor in FIG. 3 is set to 1 for thereby preventing torque correction by the equivalence ratio, and thereafter the routine is finished.

Further, at step S22, when the flag FHORS (n) is "0", i.e., when the combustion mode of the No. n cylinder at this time is judged as stratified, the control proceeds to step S25 where $\Delta$ Adv is reset to "0" for carrying out the torque correction by the equivalence ratio only and inhibiting the correction by ignition timing, and thereafter the routine is ended.

Figure 6:
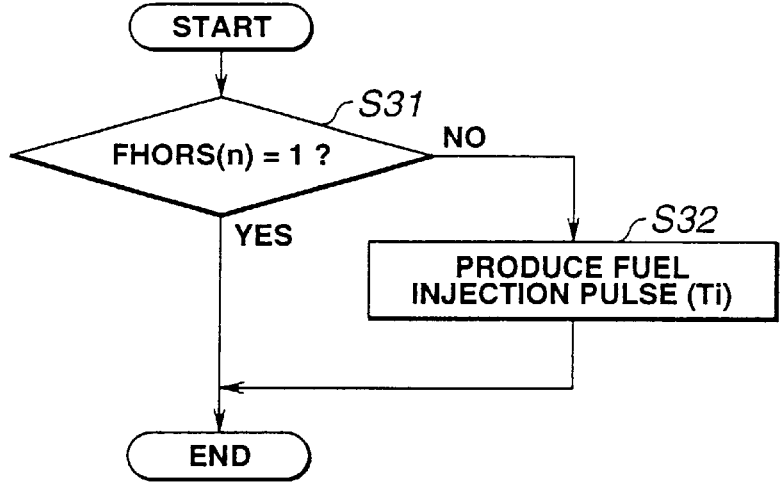
FIG. 6 is a flowchart of a routine executed at the fuel injection timing during stratified operation at each cylinder, for use in the first embodiment.

FIG. 6 shows a routine executed at each fuel injection timing (during compression stroke) during stratified operation of each cylinder (No. n cylinder).

At step S31, the value of the above described combustion mode judging flag FHORS (n) is judged. When the value of the flag FHORS (n) is "1", i.e., when the combustion mode of the No. n cylinder at this time is judged as homogeneous, this routine is finished. When, however, the value of the flag FHORS (n) is "0", i.e., when the combustion mode of the No. n cylinder at this time is judged as stratified, the control proceeds to step S32 where it is produced a fuel injection pulse signal equated to the fuel injection quantity Ti calculated by the routine shown in FIG. 3, whereby to execute stratified operation.

Figure 7:
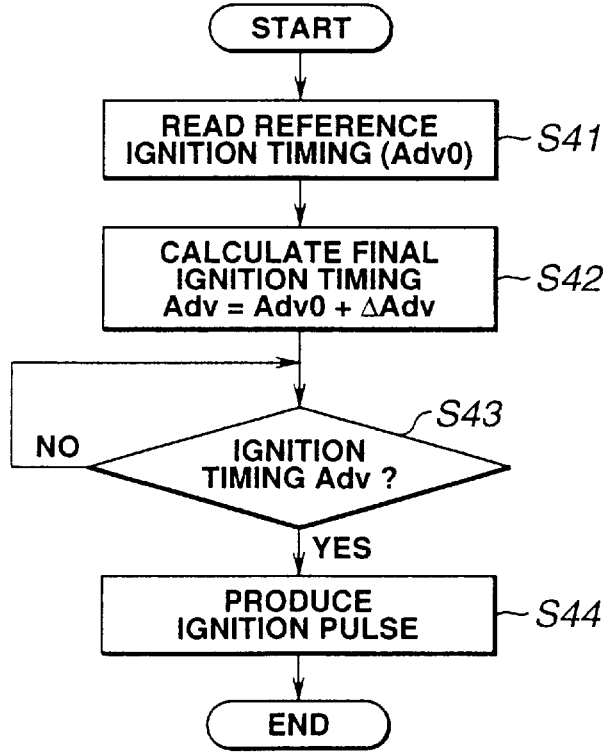
FIG. 7 is a flowchart of an ignition timing control routine at each cylinder, for use in the first embodiment.

FIG. 7 shows a routine of ignition timing control at each cylinder (No. n cylinder). This routine is executed at a predetermined crank angle prior to the ignition timing such as a time of Ref signal output.

At step S41, it is read a reference ignition timing (Adv0) which is based on an engine operating condition, for example, an engine load and engine speed and corrected by coolant temperature, etc.

At step S42, a final ignition timing Adv is calculated on the basis of the above described ignition timing correction quantity ΔAdv from the following expression.

$$Adv = Adv0 + \Delta Adv$$

At step S43, it is judged whether the ignition timing Adv calculated as above is reached, and when judged as being reached an ignition pulse is produced to carry out ignition.

Figure 10:
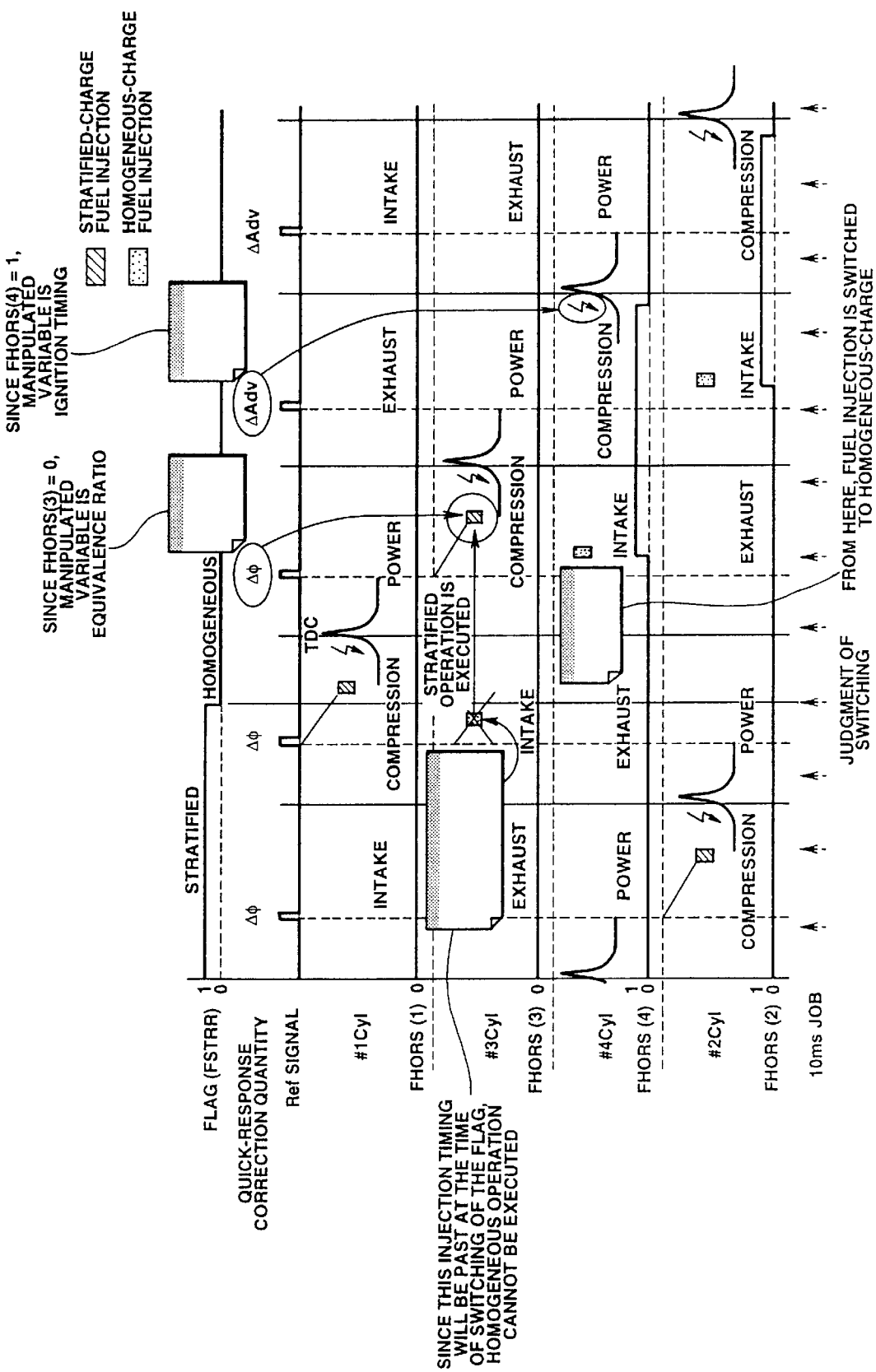
FIG. 10 is a time chart of a torque correction control at the time of switching of a combustion mode from stratified to homogeneous, effected by the first embodiment.

By the above, it becomes possible, as shown in FIG. 10, that when the combustion mode is switched from stratified to homogeneous, the combustion mode judging flag FHORS for the cylinders (#1 cylinder and #3 cylinder) whose stratified operation fuel injection timing corresponding to the combustion just after switching of the combustion mode request flag FSTRR exists prior to switching of the combustion mode judging flag FHORS (n), is set to "0" at that fuel injection timing so fuel is injected at the fuel injection timing for stratified operation to carry out stratified combustion, while it becomes possible to execute quick-response torque correction by equivalence ratio which is a manipulated variable for the stratified combustion mode. Accordingly, it becomes possible to prevent deteriorated combustion and, in the worst case, a misfire which may result from erroneous torque correction by the use of ignition timing during stratified operation.

Figure 11:
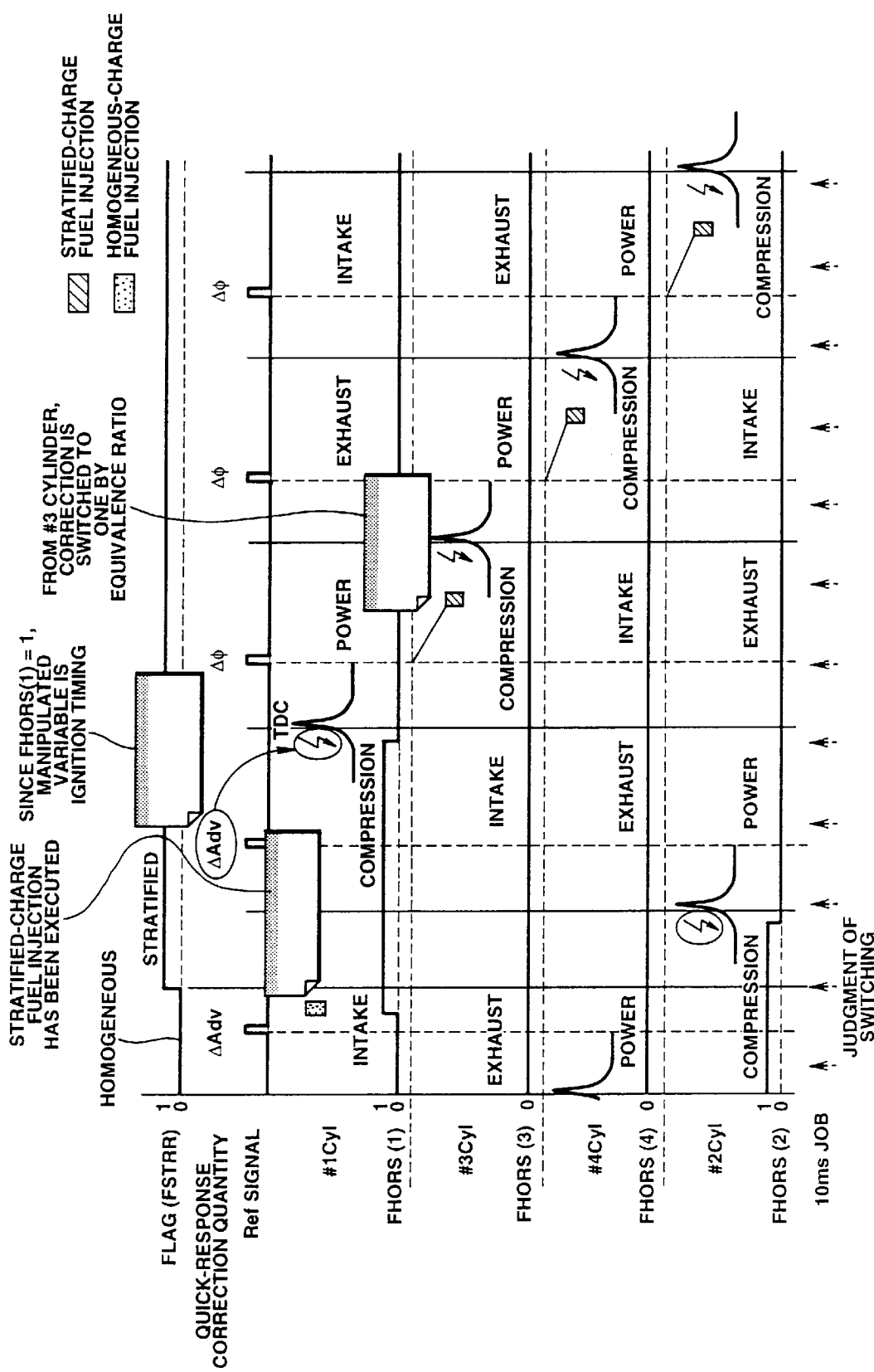
FIG. 11 is a time chart of a torque correction control at the time of switching of a combustion mode from homogeneous to stratified, effected by the first embodiment.

On the other hand, as shown in FIG. 11, when the combustion mode is switched from homogeneous to stratified, the combustion mode judging flag FHORS for the cylinders (#1 cylinder and #2 cylinder) whose homogeneous operation fuel injection timing corresponding to the combustion just after switching of the combustion mode request flag FSTRR exists prior to switching of the combustion mode judging flag FHORS (n), is set to "1" at that fuel injection timing so fuel is injected at the fuel injection timing during stratified operation to carry out stratified combustion, while it becomes possible to execute quick-response torque correction by ignition timing which is a manipulated variable for the homogeneous combustion mode. Accordingly, it becomes possible to prevent torque correction from being disabled due to the incapability of torque correction by the use of equivalence ratio after fuel injection for homogenous operation is finished, and it becomes possible to execute torque correction by the use of ignition timing corresponding to homogeneous operation.

Further, the cylinders (#3 and #4 in FIG. 10, and #3 and #4 in FIG. 11) whose homogeneous operation ignition timing corresponding to the combustion just after switching of the combustion mode request flag FSTRR comes after switching of the flag FSTRR start their operation according to the switched combustion mode from the time just after switching of the flag FSTRR, while it becomes possible to attain, on the basis of the value of the combustion mode judging flag FHORS (n), switching to quick-response torque correction by the use of equivalence ratio according to the switched combustion mode.

Figure 12:
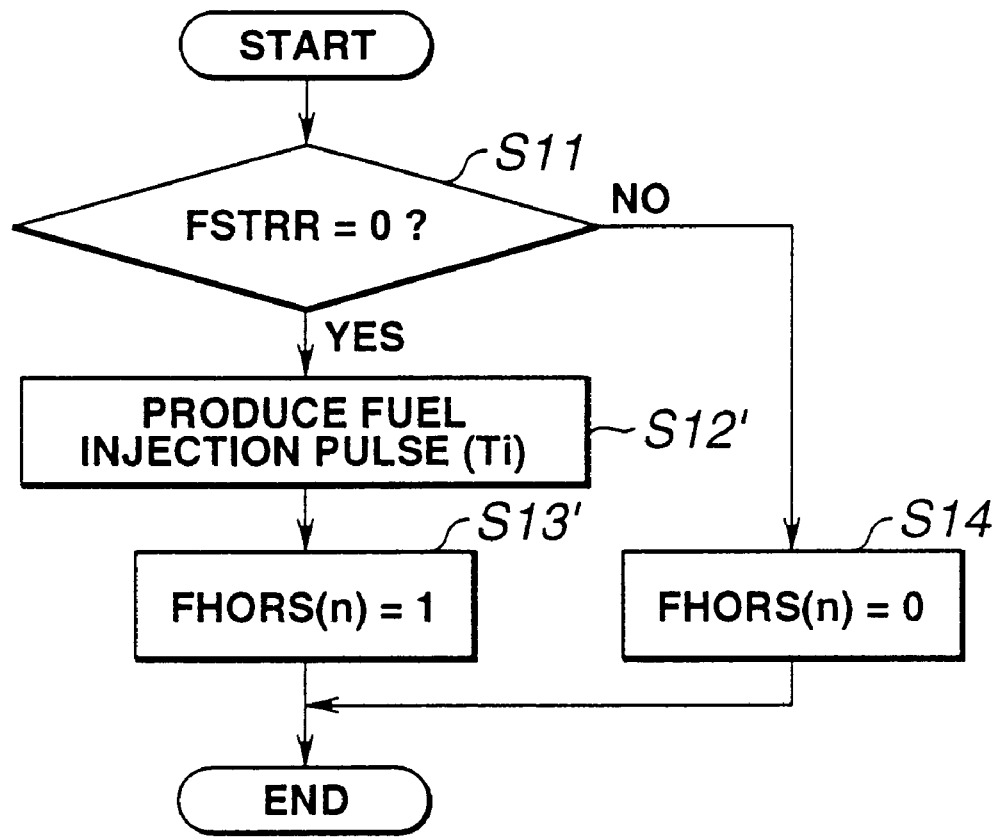
FIG. 12 is a flowchart of a control routine executed at the fuel injection timing, during homogenous operation at each cylinder, for use in the control system according to the second embodiment of the present invention.

FIG. 12 shows a routine executed at the fuel injection timing during homogeneous operation, for use in a control system according to the second embodiment of the present invention. This embodiment differs from the first embodiment in that when the combustion mode request flag FSTRR is "0", i.e., when homogeneous operation is requested, a fuel injection pulse signal is produced and thereafter the combustion mode judging flag FHORS (n) is set to "1". Other routines shown in FIG. 3 and 5 to 7 are executed in this embodiment similarly to the first embodiment. This embodiment can operate similarly to the first embodiment and can produce substantially the same effect.

Then, the third embodiment will be described.

Figure 13:
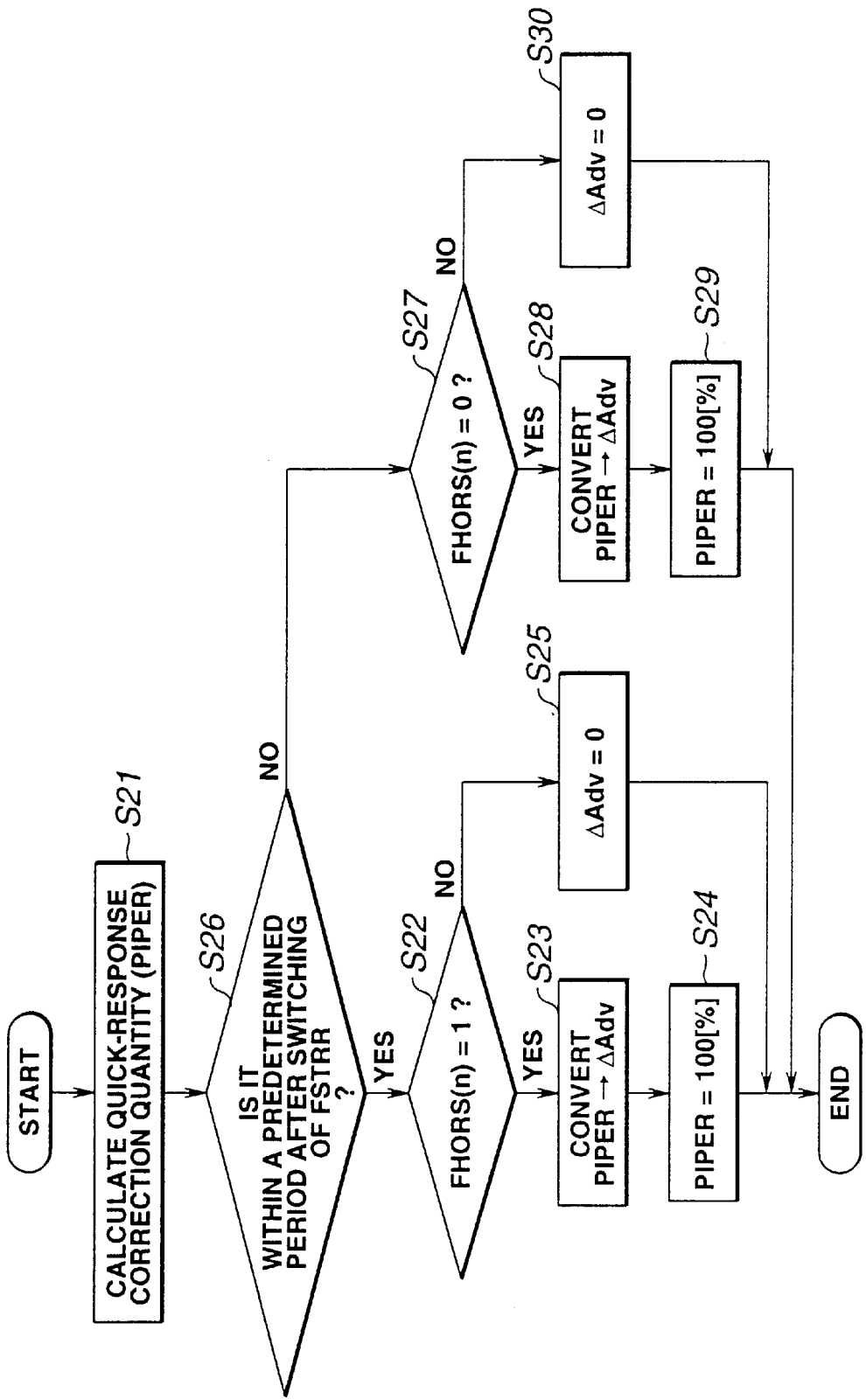
FIG. 13 is a flowchart of a control routine executed at the time of output of a Ref signal at each cylinder, for use in the control system according to the third embodiment of the present invention.

In this embodiment, the routines shown in FIGS. 3, 4 and 6 are executed similarly to the first embodiment (in place of routine in FIG. 4, routine in FIG. 12 may be used), a routine shown in FIG. 13 is executed at the time of output of Ref signal in place of the routine in FIG. 5.

At step S21, the torque correction factor PIPER is calculated for use as a quick-response torque correction quantity, and thereafter it is judged at step S26 whether a predetermined period of time has lapsed after switching of the combustion mode request flag FSTRR or not. In this connection, the above described predetermined period of time is a period of time having a possibility that the value of the flag FSTRR and the actual combustion mode do not correspond with each other at a transitional time when the request is switched, and the time of period can be obtained by the experiments conducted previously.

Then, before a predetermined period of time lapses after switching of the flag FSTRR, the control proceeds to step S22 where judgement on the value of the flag FHORS (n) is made. When it is judged that the flag FHORS (n) is "1" and the combustion mode of the No. n cylinder at this moment is judged as homogeneous, the control proceeds to step S23 where the ignition timing correction quantity ΔAdv is calculated. Thereafter, the control proceeds to step S24 where the above described torque correction factor PIPER is reset to 100%, and the routine is ended. When it is judged at step S22 that the value of the flag FHORS (n) is "0" and the combustion mode of the No. n cylinder at this moment is stratified, the control proceeds to step S25 where the ignition timing correction quantity ΔAdv is reset to "0" and then the routine is ended.

Figure 9:
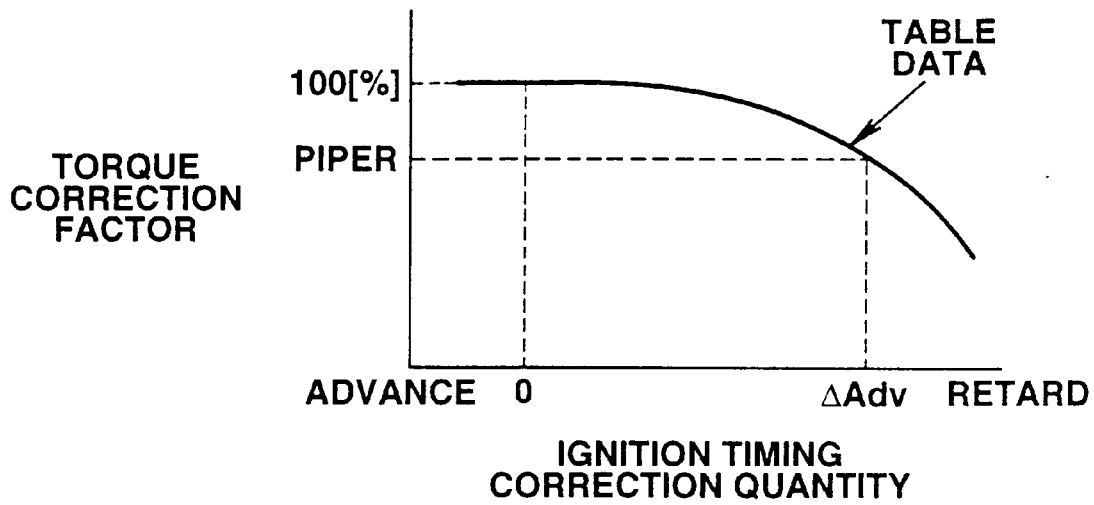
FIG. 9 is a graph illustrating a torque correction factor/ignition timing correction quantity translation table for use in the first embodiment.

Further, when it is judged at step S26 that a predetermined period of time has lapsed after switching of the flag FSTRR, the control proceeds to step S27 where the value of the flag FSTRR is judged. When the value of the flag FSTRR is "0", the combustion mode of the No. n cylinder at this moment is judged as homogeneous, and the control proceeds to step S28 where the ignition timing correction quantity Δ Adv is calculated by retrieval from the torque correction factor/ignition timing correction quantity translation table shown in FIG. 9, or the like. Then, the control proceeds to step S29 where the above described torque correction factor PIPER is reset to 100%, and the routine is ended.

This embodiment is structured such that after lapse of the above described predetermined period of time the combustion mode is judged by the use of the combustion mode request flag FSTRR in place of the combustion mode judging flag FHORS (n), whereby the calculation load can be reduced. That is, in case the flag HORS (n) is used, it is required to carry out on soft ware such a process of selecting one value from the array of the combustion mode judging flag FHORS (n) by using a variable which is a cylinder number n. In case the flag FSTRR is used, such a selection process can be dispensed with, thus making it possible to reduce the calculation load.

Then, the fourth embodiment will be described.

Figure 14:
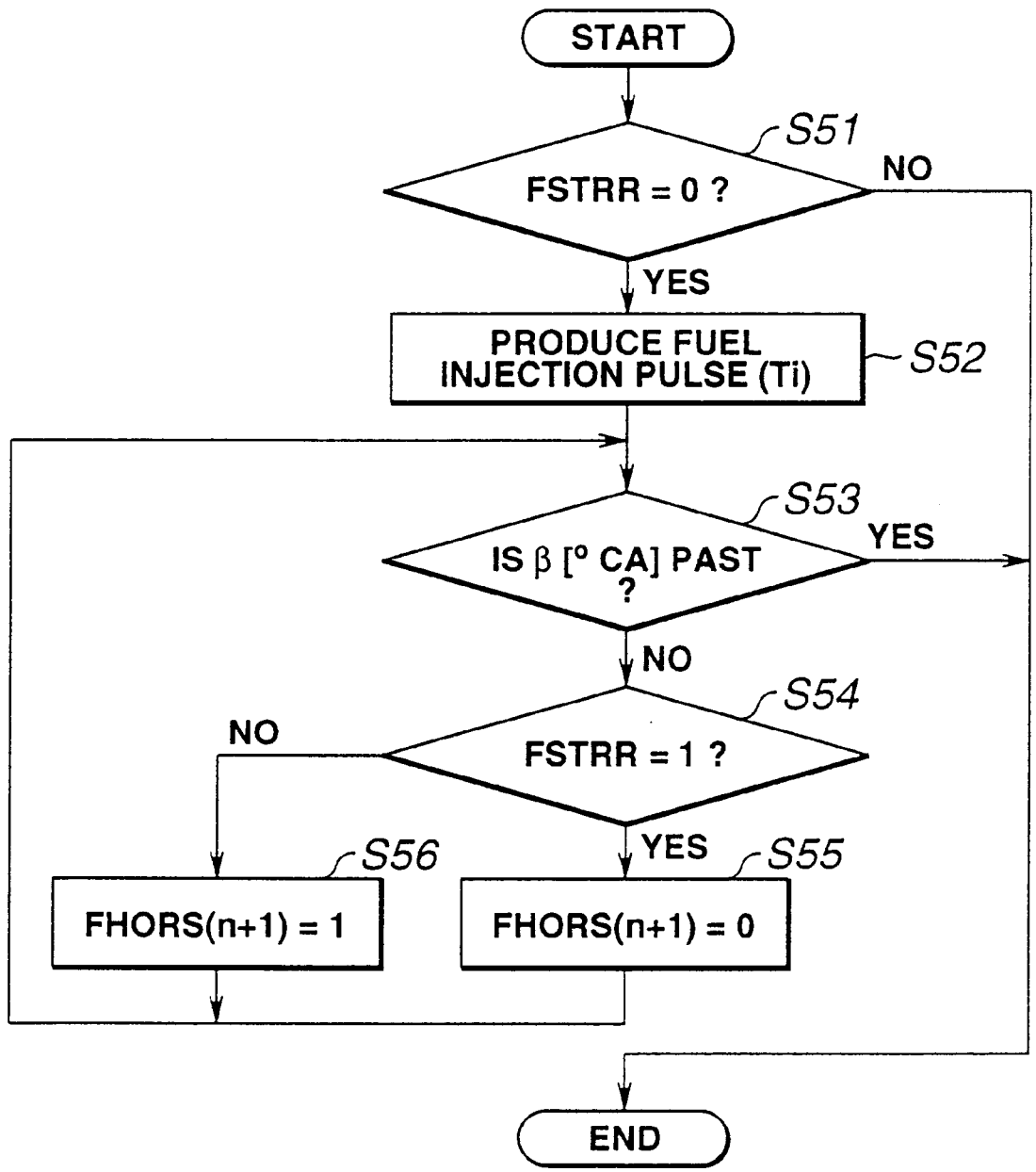
FIG.14 is a flowchart of a control routine executed at the fuel injection timing during homogeneous operation at each cylinder, for use in the control system according to the fourth embodiment of the present invention.
Figure 15:
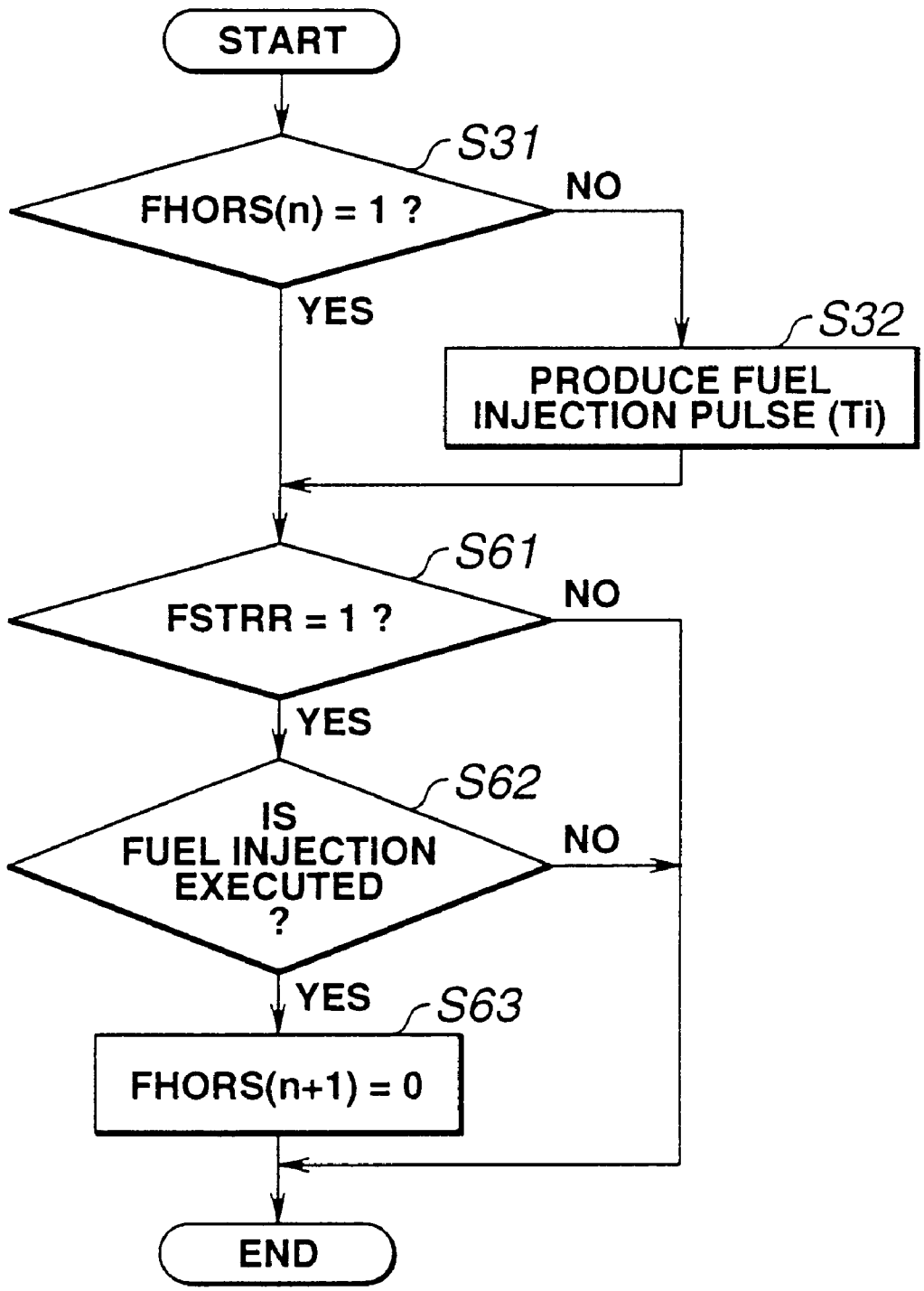
FIG. 15 is a flowchart of a control routine executed at the fuel injection timing during stratified operation at each cylinder, for use in the fourth embodiment.
Figure 16:
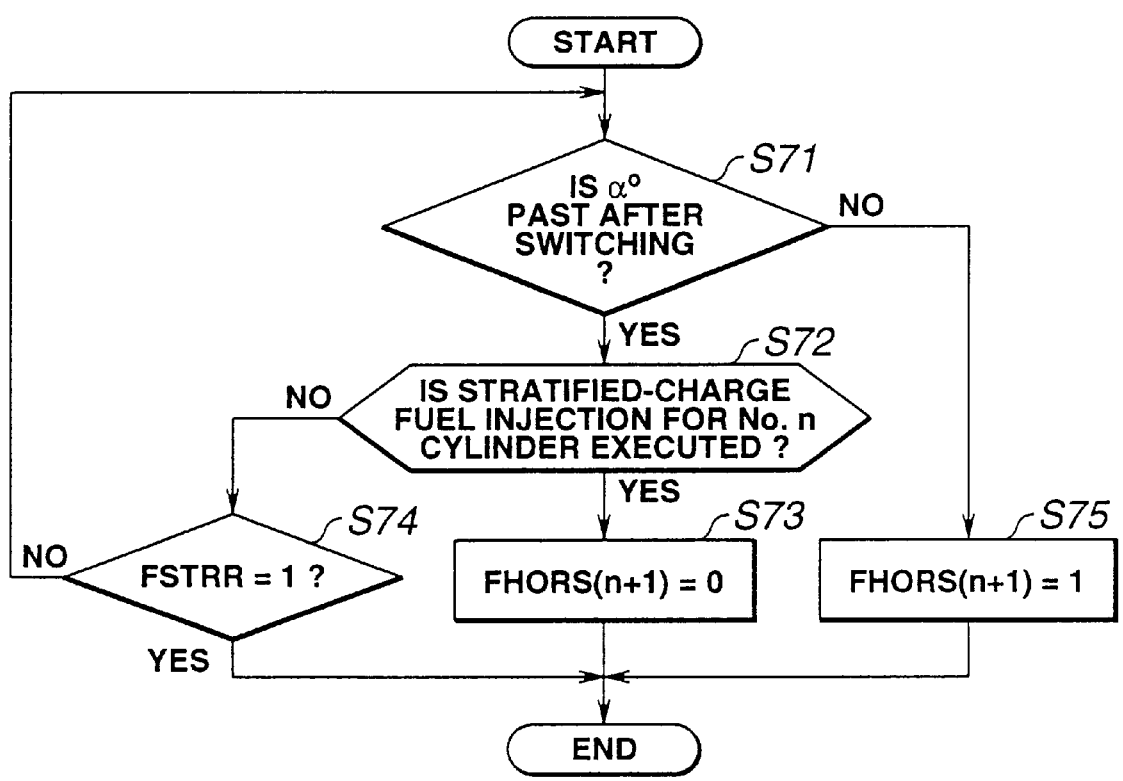
FIG. 16 is a flowchart of a control routine executed when it is requested to switch a combustion mode from stratified to homogeneous, for use in the fourth embodiment.

In this embodiment, the routines in FIGS. 3 and 5 are executed similarly to the first embodiment, and other routines shown in FIGS. 14 to 16 are executed.

FIG. 14 shows a routine executed at the fuel injection timing during homogeneous operation of the No. n cylinder.

At step S51, judgement on the value of the combustion mode request flag FSTRR is made.

At step S51, when the value of the flag FSTRR is requested to be "1", i.e., when a stratified combustion mode is requested, this routine is ended. On the other hand, when the value of the flag FSTRR is requested to be "0", i.e., a homogeneous combustion mode is requested, the control proceeds to the step S52 where a fuel injection pulse signal (Ti) is produced.

At step S53, it is judged whether a predetermined crank angle β (second set crank angle) has been past after the fuel injection timing during the requested homogeneous operation or not. In this connection, the above described set crank angle β is set to a crank angle between the fuel injection timing during homogeneous operation of the No. n cylinder and the fuel injection timing during homogeneous operation of the No. (n+1) cylinder (e.g., 180 degrees in case of four-cylinder internal combustion engine).

When it is judged that the set crank angle β has not yet been past, the control proceeds to step S54 where the it is judged whether the combustion mode request flag FSTRR has been switched to "1" or not. In the event the flag FSTRR has been switched to "1"before the set crank angle β is past, the control proceeds to step S55 where the combustion mode judging flag FHORS (n+1) for the next No. (n+1) cylinder is switch to "0", i.e., a stratified combustion mode, whereas in the event the flag FSTRR is maintained at "0", the control proceeds to step S56 where the combustion mode judging flag FHORS for the next No. (n+1) cylinder is maintained at "1", and thereafter the control returns to step S153.

When it is judged at step S53 that the set crank angle has been past, this routine is ended.

That is, in the event fuel injection for homogeneous operation is carried out at No. n cylinder and homogeneous operation is performed at that cylinder, it is judged that also the combustion mode of the next No. (n+1) cylinder is judged as homogeneous unless the flag STRR is switched to "1" (i.e., homogenous combustion mode) before the set crank angle β is past after execution of fuel injection, i.e., until the fuel injection timing during homogeneous operation of the next No. (n+1) cylinder comes. Although there is a possibility that switching to the stratified combustion mode occurs after that, it will become incapable of carrying out homogeneous operation unless fuel injection is carried out at that moment, so fuel injection is carried out to perform homogenous operation. Further, in the event the flag FSTRR is switched to "1" (stratified combustion mode) before the set crank angle β is past, the combustion or operation of the No. (n+1) cylinder can be stratified as requested and thus it is judged that the combustion mode is stratified.

FIG. 15 shows a routine executed at the fuel injection timing during stratified operation of No. n cylinder.

At step S31, judgement on the value of the combustion mode judging flag FHORS (n) is made. When the value of the flag FHORS (n) is "1", the control proceeds to step S61, whereas when the value is "0", the control proceeds to step S32 where fuel injection for stratified operation of the No. n cylinder is carried out, and thereafter the control proceeds to step S61.

After the process similar to that shown in FIG. 6 is carried out, it is judged at step S61 whether the combustion mode request flag FSTRR is "1", i.e., the stratified combustion mode is requested.

When it is judged that the flag FSTRR is "1" the control proceeds to step S62 where it is judged whether fuel injection for stratified operation of the No. n cylinder executed out or not.

In the event it is judged at step S62 that fuel injection for stratified operation of the No. n cylinder has been executed, the control proceeds to step S63 where the combustion mode judging flag FHORS (n+1) is set to "0", and it is judged that the combustion mode of the next No. (n+1) cylinder is stratified.

Figure 17:
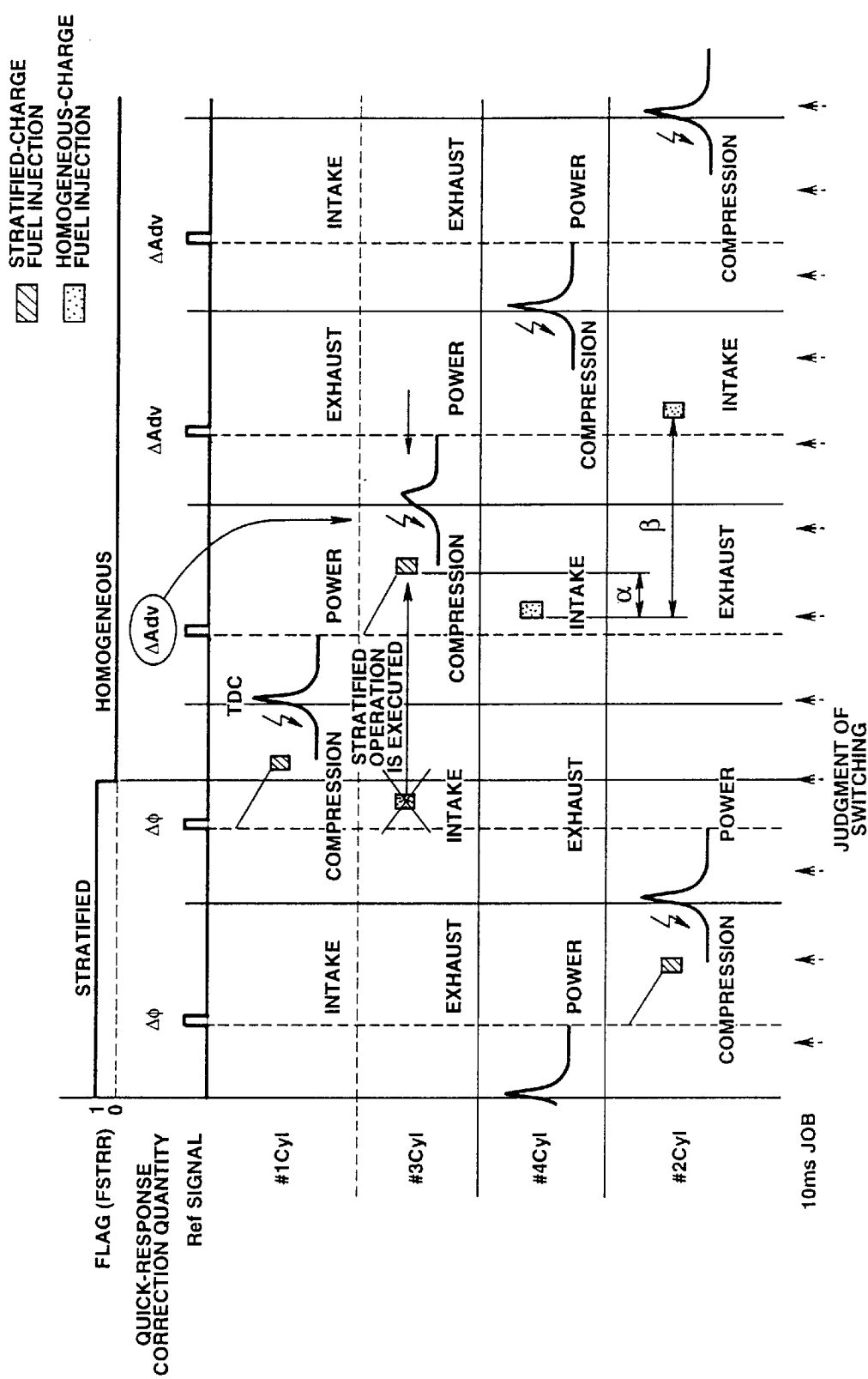
FIG. 17 is a time chart for illustration of the definition of a first set crank angle and a second set crank angle, for use in the fourth embodiment.

This is because in the event the stratified combustion mode is requested at the fuel injection timing for stratified operation of the No. n cylinder and stratified operation is carried out, the fuel injection timing for homogeneous operation of the next No. (n+1) cylinder has already been past as shown in FIG. 17 and it is impossible to carry out homogeneous operation at the No. (n+1) cylinder even If the request of the combustion mode is switched to that for homogeneous after that, so the combustion mode of the No. (n+1) cylinder is judged as stratified.

FIG. 16 shows a routine executed when the combustion mode request flag FSTRR is switched from "1" (stratified combustion mode) to "0" (homogeneous combustion mode).

At step S71, it is judged whether a set crank angle α (first set crank angle) has been past after switching of the above described request or not. In this connection, the crank angle α, as shown in FIG. 17, is set to a crank angle between the fuel injection timing for homogeneous operation of the No. (n+1) cylinder and the fuel injection timing for stratified operation of the No. n cylinder.

When it is the time before the set crank angle is past, the control proceeds to step S72 where it is judged whether fuel injection for stratified operation is executed at the No. n cylinder so that the No. n cylinder is in a condition of carrying out stratified operation or not.

When it is judged that fuel injection for stratified operation has been executed, the control proceeds to step S73 where the combustion mode judging flag FHORS 8n+1) is set to "0" and it is judged that the combustion mode of the next No. (n+1) cylinder as stratified, and thereafter the routine is ended.

When it is judged that fuel injection for stratified operation has not yet been executed, the control proceeds to step S74 where it is judged whether the combustion mode request flag FSTRR is switched to "1" (stratified operation). When it is judged that the combustion mode has been switched to stratified, this routine is ended, and when not switched the control returns to step S71.

In the event the above described set crank angle α is past without execution of fuel injection for stratified operation and without switching of the combustion mode request flag FSTRR, i.e., in the event stratified operation will be executed after the set crank angle α is past (since stratified operation will necessarily be executed, recognition of its execution is not necessary), the control proceeds to step S75 where the combustion mode judging flag FHORS (n+1) is set to "1" and judgement is made on the combustion mode on the next No. (n+1) cylinder, and thereafter the routine is ended.

That is, the case fuel injection for stratified operation of the No. n cylinder is carried out before the above described set crank angle is past is the case the request is switched to homogeneous operation after the fuel injection timing for homogeneous operation of the No. (n+1) cylinder, so the No. (n+1) cylinder cannot carry out homogeneous operation but stratified operation and thus the combustion mode of the No. (n+1) cylinder is judged as homogenous. Further, the case fuel injection for stratified operation of the No. n cylinder is carried out after passage of the set crank angle α is the case the request is switched to homogeneous before the fuel injection timing for homogeneous operation of the No. (n+1) cylinder, so the No. (n+1) cylinder can perform homogeneous operation and thus the combustion mode of the No. (n+1) cylinder is judged as homogeneous.

Then, the fifth embodiment will be described.

Figure 18:
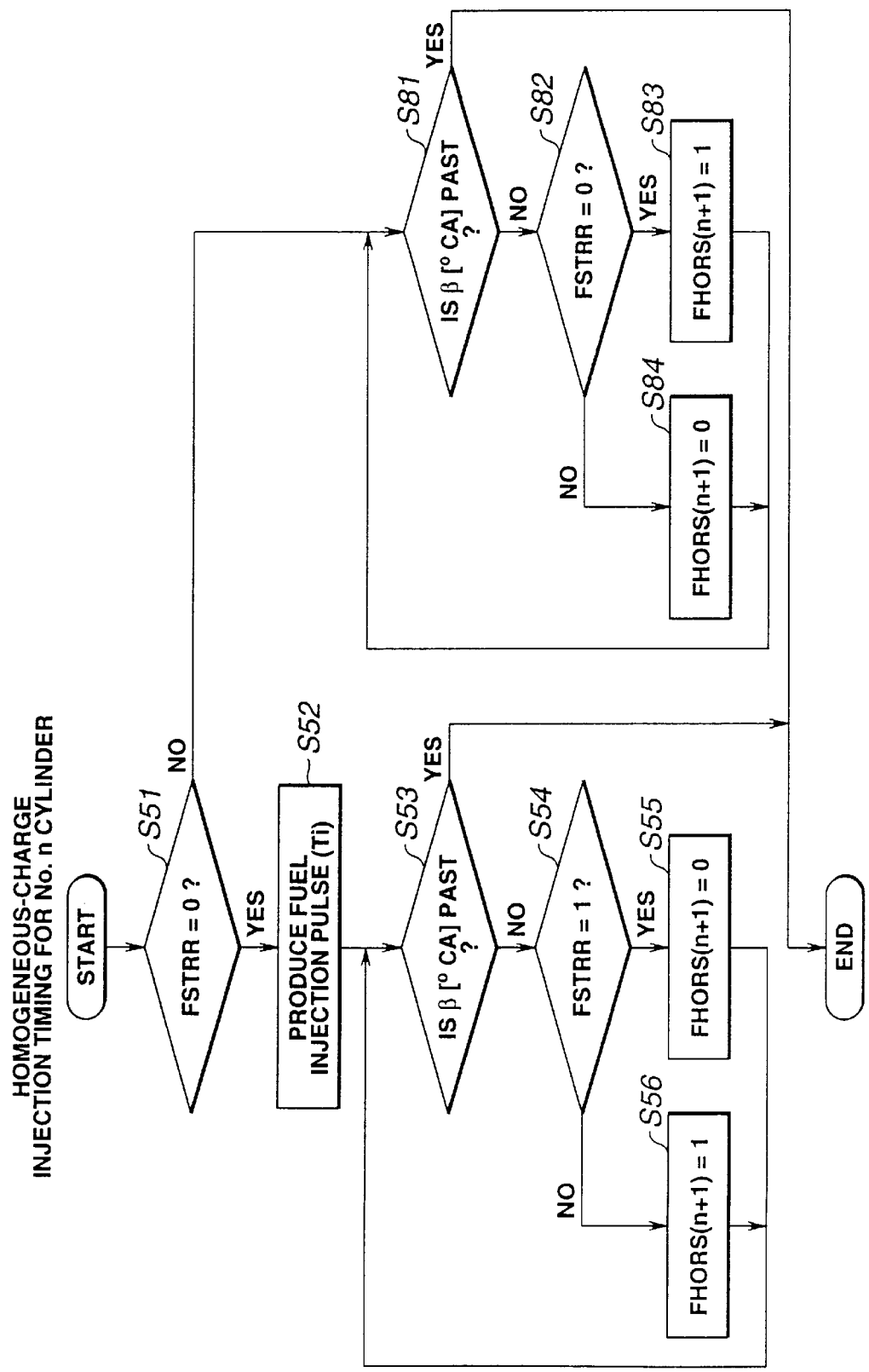
FIG. 18 is a flowchart of a control routine executed at the fuel injection timing during homogeneous operation at each cylinder, for use in the control system according to the fifth embodiment of the present invention.

In this embodiment, the routines of FIGS. 3 and 5 to 7 are executed similarly to the first embodiment, and in addition the routine shown in FIG. 18 is executed.

FIG. 18 shows a routine of a fuel injection timing for homogeneous operation of the No. n cylinder.

The steps S51 to S56 are the same as those of the routine shown in FIG. 14, so repeated description thereto is omitted for brevity.

In case at step S51 the value of the combustion mode request flag FSTRR is requested to "1", i.e., stratified operation is requested, the control proceeds to step S81 where it is judged whether the above described set crank angle β (second set crank angle) has been past after the fuel injection timing for the corresponding homogeneous operation. In case the set crank angle β has not yet been past, the control proceeds to step S82 where it is judged whether the combustion mode request flag FSTRR has been switched to "0". In case the flag FSTRR is switched to "0" before the set crank angle β is past, the control proceeds to step S83 where the combustion mode judging flag FHORS (n+1) for the next No (n+1) cylinder is switched to "1", i.e., homogeneous. In case the flag FSTRR is maintained at "1", the control proceeds to step S84 where the combustion mode judging flag FHORS (n+1) for the No. (n+1) cylinder is maintained at "0", and thereafter the control returns to step S81 and when it is judged at step S81 that the set crank angle β has been past the control routine is ended.

That is, in case the combustion mode request is not switched to homogeneous before the set crank angle β0 is past after the condition where the stratified combustion mode is requested at the fuel injection timing for homogeneous operation of the No. n cylinder, i.e., from that condition till the fuel injection timing for homogeneous operation of the No. (n+1) cylinder, it is necessary to execute stratified operation since it is impossible, even if the combustion mode request is switched to homogeneous later, the fuel injection timing for homogeneous operation of the No. (n+1) cylinder has already been past, so the combustion mode of the No. (n+1) cylinder is judged as stratified. Further, in case the request is switched to the stratified combustion mode before the set crank angle β is past, switching of the request has been made before the fuel injection timing for homogeneous operation of the No. (n+1) cylinder, so homogeneous operation can be carried out as requested and thus the combustion mode of the No. (n+1) cylinder is judged as homogeneous.

While in the above described embodiments the combustion mode judging flag FHORS (n) is provided to each cylinder, the flags FHORS for the respective cylinder can be a single variable if the periods of time from setting of the flags for the respective cylinder till selection of manipulated variables for quick-response torque correction at the time of production of a Ref signal do not overlap each other.

Figure 19:
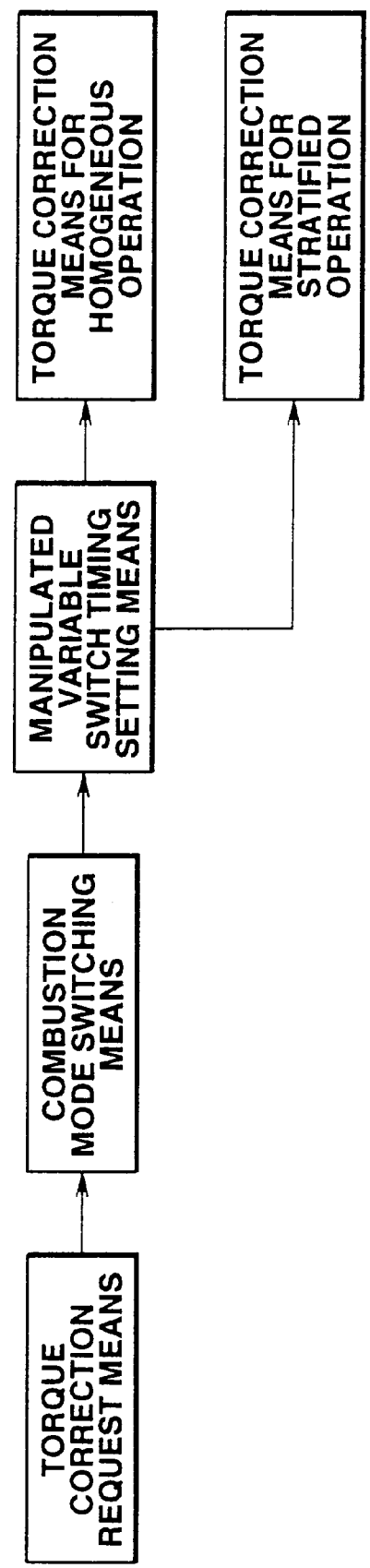
FIG. 19 is a block diagram of a control system for an internal combustion engine according to the sixth embodiment of the present invention.

FIG. 19 shows a control system according to the sixth embodiment of the present invention. As illustrated, the control system comprises combustion mode switching means for switching a combustion mode from one of a homogeneous combustion mode and a stratified combustion mode to the other according to an operating condition of the engine, torque correction request means for requesting torque correction according to an operating condition of the engine, torque correction means (for homogeneous combustion mode and stratified combustion mode) for making the torque correction by manipulating different manipulated variables in the respective homogeneous and stratified combustion modes, and manipulated variable switching timing setting means for setting, when the combustion mode switching means is requested to switch a combustion mode during execution of the torque correction, a manipulated variable switching timing at which the manipulated variables are switched, according to whether the combustion mode is switched by the combustion mode switching means from the homogeneous combustion mode to the stratified combustion mode or vice versa.

Referring to the flowchart of FIG. 20, the torque control (torque correction) routine for use in the control system according to the sixth embodiment of the present invention will be described. This routine is executed at an interval of a predetermined time, specifically every 10 ms (10 ms-JOB) during the time a quick-response torque correction is requested.

At step S101, judgement is made on whether a combustion mode is homogeneous or stratified. In this connection, the combustion mode is requested by another routine constituting a combustion mode switching means, on the basis of an engine operating condition and by making a reference to a combustion mode changing map.

When it is judged at step S101 that the combustion mode is stratified, the control proceeds to step S102 where a torque correction factor PIPER is read. In this connection, the torque correction factor PIPER is a correction factor of a torque which is obtained according to a delayed cylinder intake air quantity dQa which is an actual cylinder intake air quantity and a target equivalence ratio t φ, relative to a target torque which is obtained according to a target cylinder intake air quantity tQa and a target torque t φ. Accordingly, as the actual torque becomes closer to the target torque by an equivalence ratio correction and an ignition timing correction made in response to request of torque correction which will be described hereinlater, the torque correction factor PIPER becomes smaller.

At step S103, it is judged whether the torque correction factor PIPER which is becoming smaller as described above, is smaller than a predetermined value ε. When it is judged that the torque correction factor PIPER is not smaller than the predetermined value, the control proceeds to step S104.

At step S104, the equivalence ratio correction factor Δ φ0 is calculated by retrieval from the torque correction ratio/equivalence ratio correction factor translation table shown in FIG. 8.

At step S105, the above described equivalence ratio correction factor Δ φ0 is stored for use as a predetermined variable. By this, a control for correcting the equivalence ratio by the use of the equivalence ratio correction factor Δφ0 is executed by another job, and torque correction according to the torque correction factor PIPER is carried out.

At step S106, a flag FADJINH which indicates that it is during correction of the equivalence ratio at the time of stratified operation, is set to "1".

When, as a result of making correction of the equivalence ratio as above, it is judged at step S103 that the torque correction factor PIPER is smaller than the predetermined value ε, it is determined that the equivalence ratio has converged sufficiently to a target value and correction has been completed, and the control proceeds to step S107 where the above described flag FADJINH is reset to "0".

On the other hand, when it is judged at step S101 that the combustion mode is homogeneous, the control proceeds to step S108 where judgement on the value of the flag FADJINH is made.

When the above described flag FADJINH is "0", that is, when the combustion mode is switched to homogeneous when torque correction during stratified operation is not executed, the control proceeds to step S109 where the torque correction factor PIPER is read.

At step S110, the ignition timing correction quantity ΔAdv0 is calculated by retrieval from the torque correction factor/ignition timing correction quantity translation table shown in FIG. 8, or the like.

At step S111, the above described ignition timing correction quantity ΔAdv0 is stored for use as a predetermined variable. By this, a control for correcting the ignition timing by the ignition timing correcting quantity ΔAdv0 is executed by another job, and correction according to the torque correction factor PIPER is carried out.

On the other hand, when it is judged at step S108 that the flag FADJINH is "1", i.e., when the combustion mode is switched to homogeneous during execution of the torque correction at the time of the above described homogeneous operation, the control returns to step S102 where the torque correction by the use of the equivalence ratio is executed continuously.

In the meantime, the routine may be structured such that after the flag FADJINH is reset to "0" at step S107, the control proceeds to step S110 (the same in the second embodiment in FIG. 7). That is, although the ignition timing correction should not be made during homogeneous operation in principal, such correction is carried out, after the torque correction factor PIPER becomes smaller than the predetermined value ε and therefore becomes to be a sufficiently small value, for making fine adjustment of the ignition timing and thereby allowing it to go closer to zero.

Figure 21:
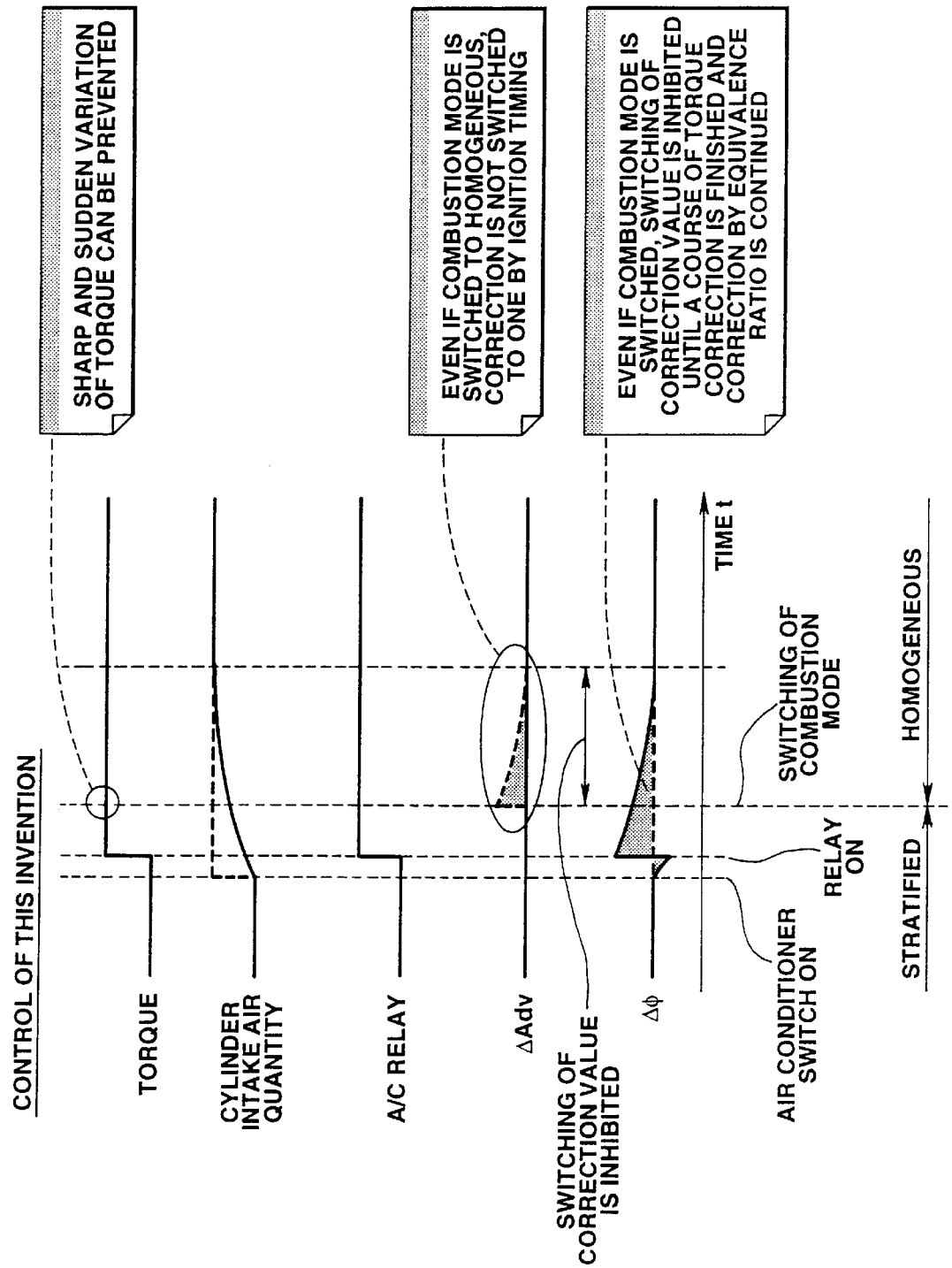
FIG. 21 is a time chart of a torque correction control at the time of switching of a combustion mode from stratified to homogeneous, which is effected by the sixth embodiment.

FIG. 21 shows a state resulting when under the control of the first embodiment, switching to homogeneous charge operation takes place during execution of torque correction in response to request of torque correction at the time of stratified operation.

When an air conditioner switch is turned on during stratified operation, increase of torque is requested, and in response to this request the target intake air quantity is increased to increase the intake air quantity. However, it is after the equivalence ratio correction factor Δφ0 is increased gradually in time to delay in increase of the actual intake air quantity for thereby maintaining the torque constant that an air conditioner relay is turned on to start operation of the air conditioner. At this step of procedure, the intake air quantity has not yet reached the target value, so the equivalence ratio correction factor Δφ0 is increased sharply and suddenly in such a manner as to show a jump for thereby increasing torque responsively and is then reduced gradually in time to subsequent increase of the intake air quantity, whereby to maintain the torque constant.

When it is requested to switch the combustion mode during execution of torque correction by correction of the equivalence ratio during stratified operation, there is a possibility of causing a sudden and sharp variation of torque at the transition between the equivalence ratio correction and the ignition timing correction since during homogeneous operation the torque correction is properly made by the ignition timing correction. Thus, in the event the combustion mode is switched to homogeneous during correction of torque by the use of the equivalence ratio in stratified operation, torque correction by the use of the equivalence ratio is continued after that time, whereby occurrence of a sudden and sharp variation of torque at that transition can be avoided and a torque shock can be prevented. Further, as a reason why the correction by the equivalence ratio is continued, there can be adduced that when switching to the ignition timing correction is made at the time of homogeneous operation, the torque cannot be increased by ignition timing advance if the basic ignition timing for homogeneous operation is set adjacent to MBT (ignition timing at which maximum torque is produced) and therefore desired torque correction cannot be attained.

Figure 22:
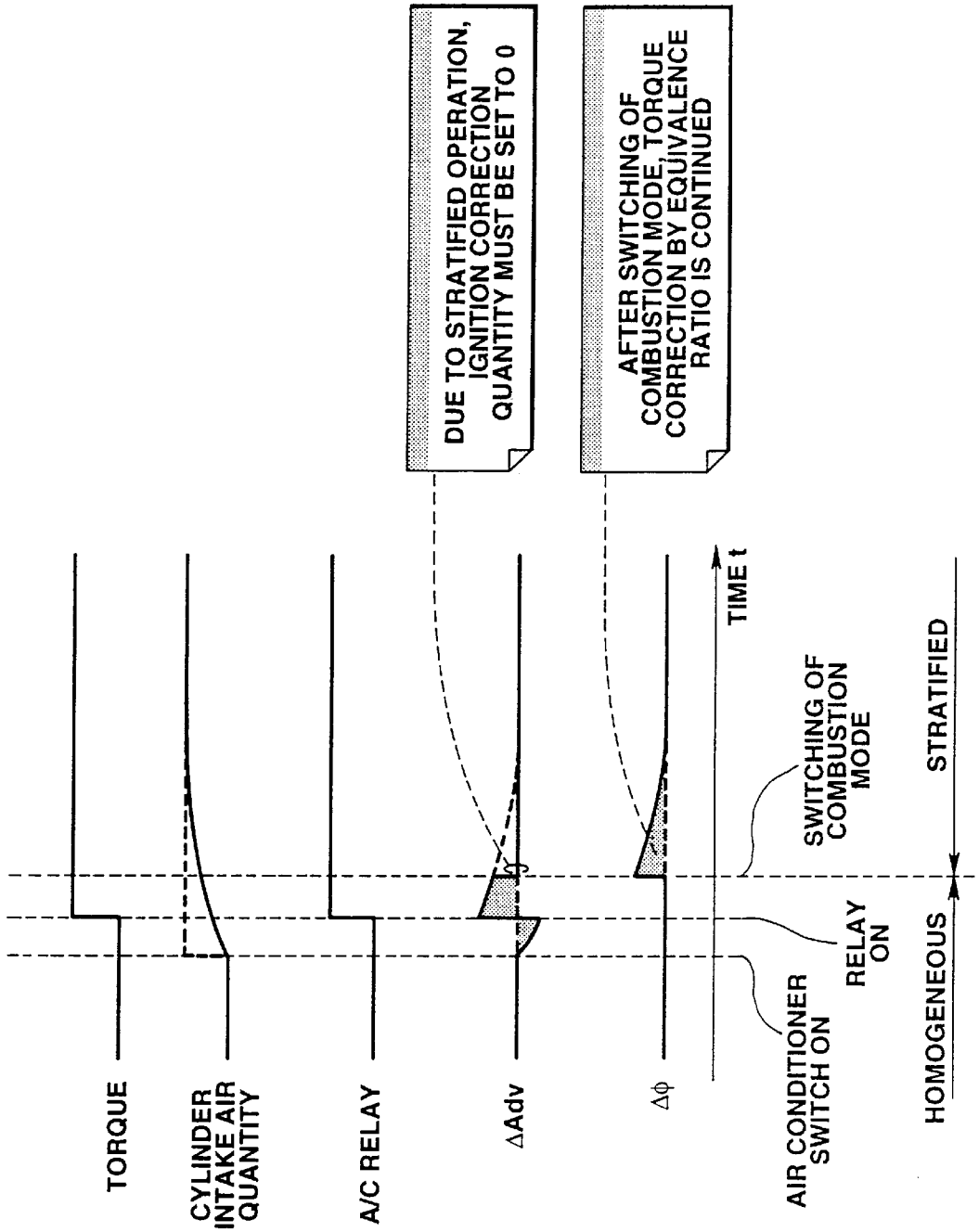
FIG. 22 is a time chart of a torque correction control at the time of switching of a combustion mode from homogeneous to stratified, which effected by the sixth embodiment.

FIG. 22 shows a state resulting when under the control of the first embodiment, torque correction is requested at the time of homogeneous operation and switching to stratified operation takes place during execution of the torque correction.

When the air conditioner switch is turned on at the time of homogeneous operation, a control for increasing the intake air quantity starts and the ignition timing correction quantity ΔAdv is retarded, whereby to maintain the toque constant. After that, the air conditioner relay is turned on to start operation of the air conditioner, the deficiency of the intake air quantity with respect to the target value is compensated for by increasing the ignition timing correction quantity ΔAdv sharply and suddenly in a way as to show a jump, for thereby increasing the torque responsively, and the ignition timing correction quantity ΔAdv is reduced gradually in time to subsequent increase of the intake air quantity, whereby to maintain the torque constant.

When it is requested to switch the combustion mode during execution of torque correction by the ignition timing correction at the time of homogeneous operation, it is actually impossible to execute the torque correction by the ignition timing correction since, as mentioned above, the ignition timing correction range is small during stratified operation. Thus, simultaneously with switching of the combustion mode, the equivalence ratio correction factor Δφ corresponding to the torque correction factor at that moment is calculated by retrieval from a map, or the like and thereafter the equivalence ratio correction factor is reduced gradually in time to increase of the intake air quantity.

Figure 23:
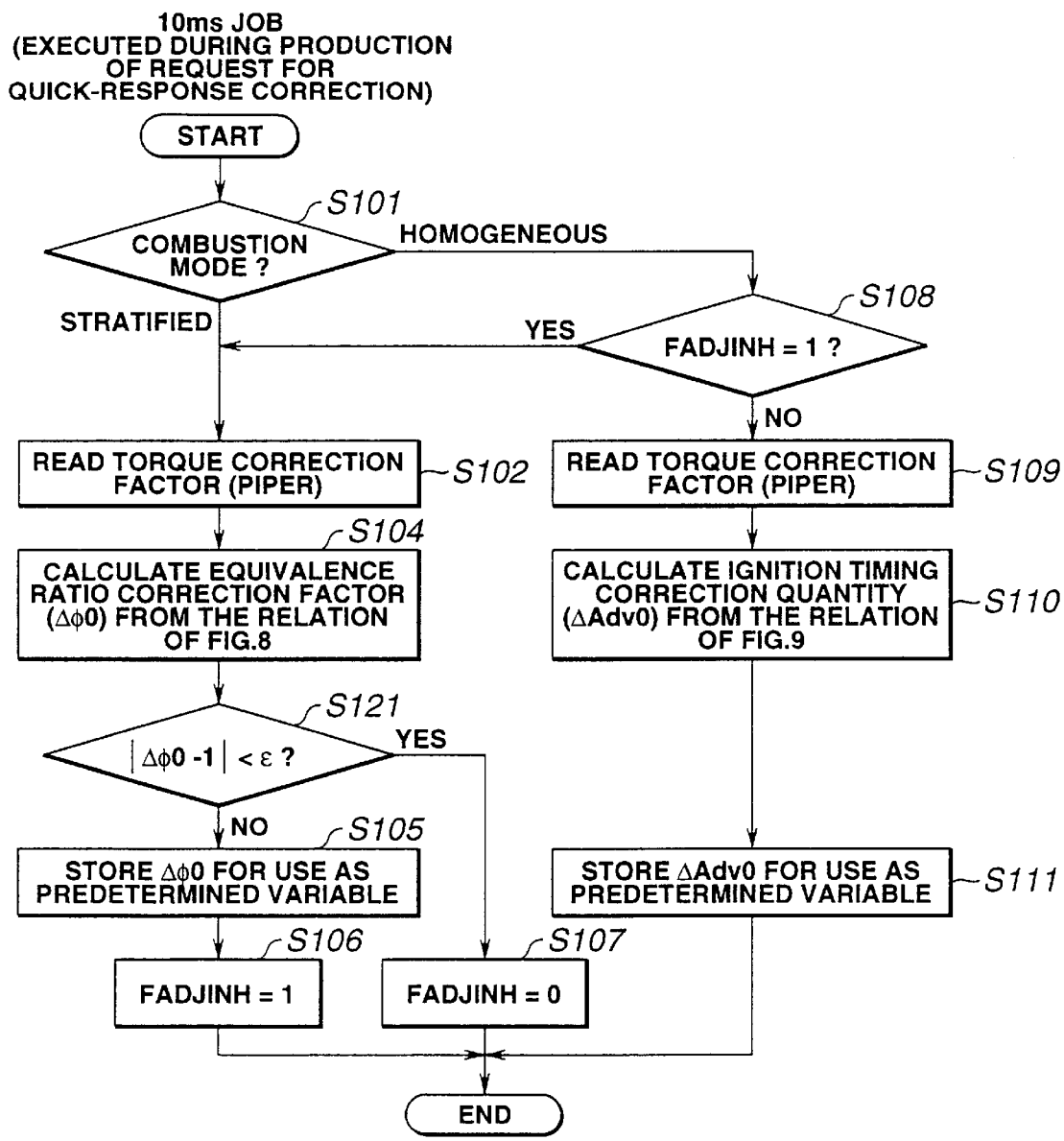
FIG. 23 is a flowchart of a torque correction routine for use in the control system according to the seventh embodiment of the present invention.

Referring to FIG. 23, a torque control (torque correction) according to the seventh embodiment will be described.

Figure 20:
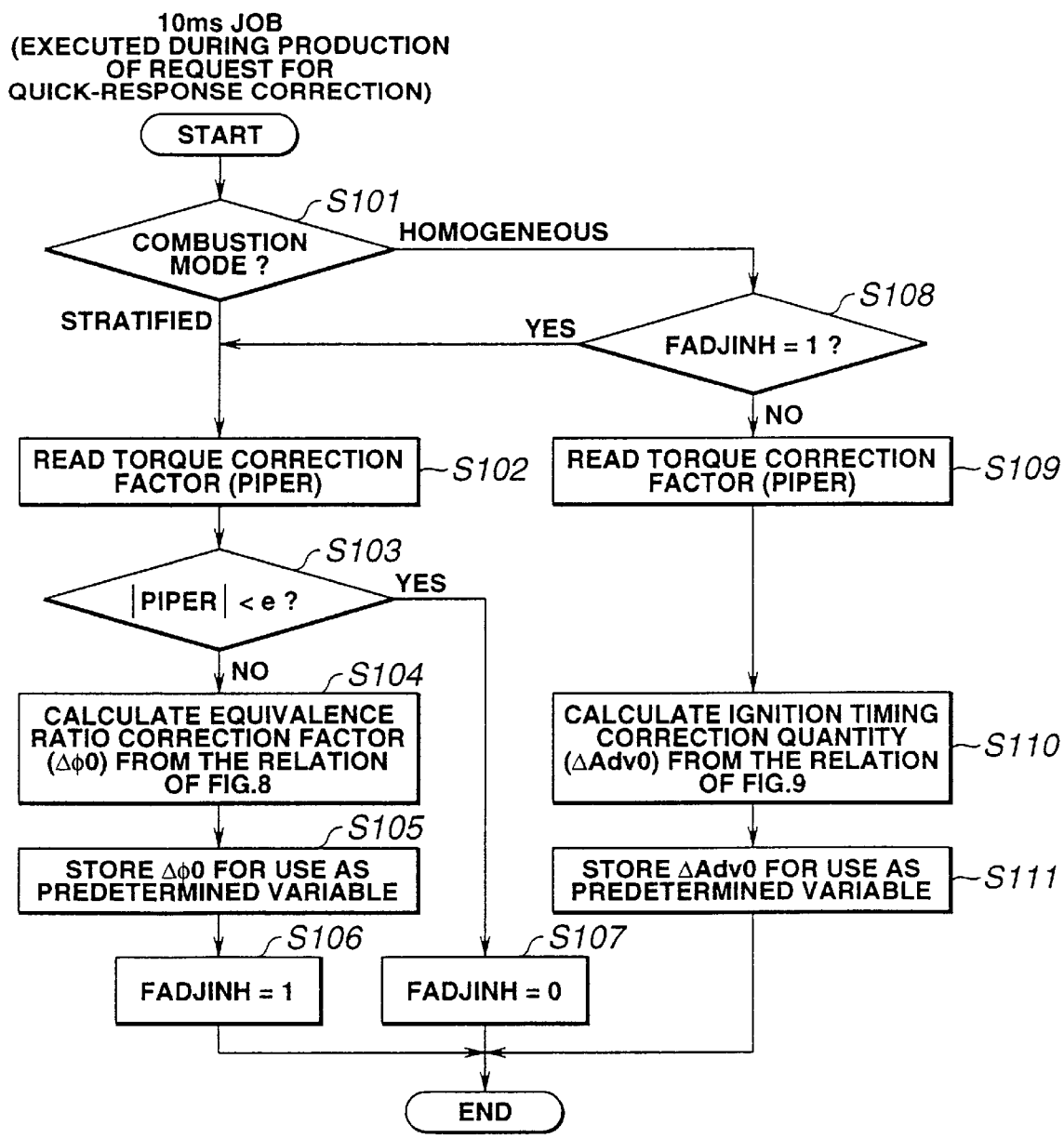
FIG. 20 is a flowchart of a torque correction routine for use in the control system of the sixth embodiment.

The difference from the sixth embodiment shown in FIG. 20 resides in that, in contrast to the first embodiment constructed to complete at step S103 the torque correction by the equivalence ratio correction factor Δφ when the equivalence ratio correction factor Δφ PIPER becomes smaller than a predetermined value, the second embodiment is constructed to complete at step S121 the torque correction when the deviation |Δφ0−1| of the equivalence ratio correction factor Δφ0 decreasing with decrease of the torque correction factor PIPER, from a reference value "1" in case of no equivalence ratio correction, becomes smaller than a predetermined ε. Except for the above, the second embodiment is substantially similar to the first embodiment.

Figure 24:
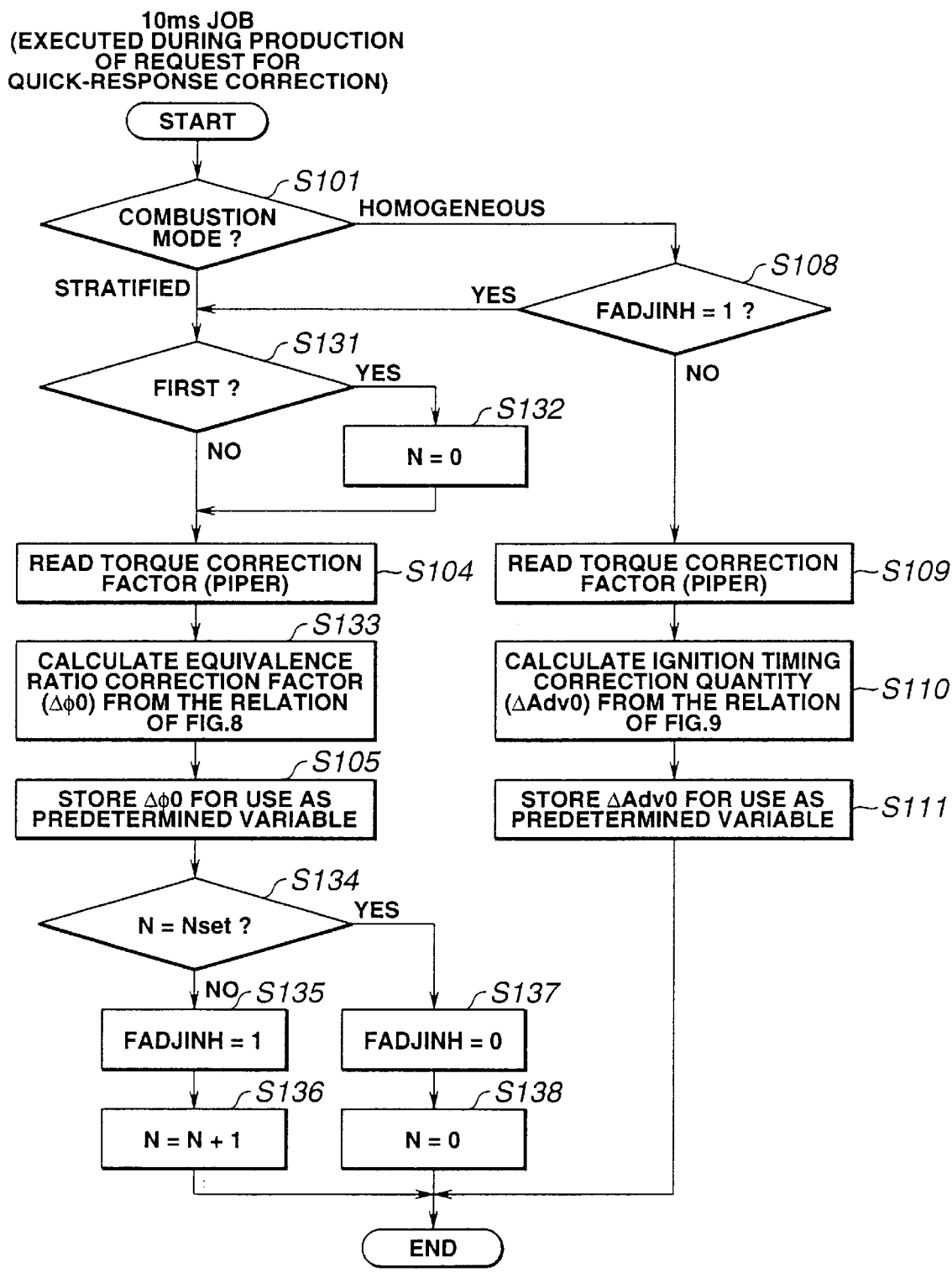
FIG. 24 is a flowchart of a torque correction routine for use in the control system according to the eighth embodiment of the present invention.
Figure 25:
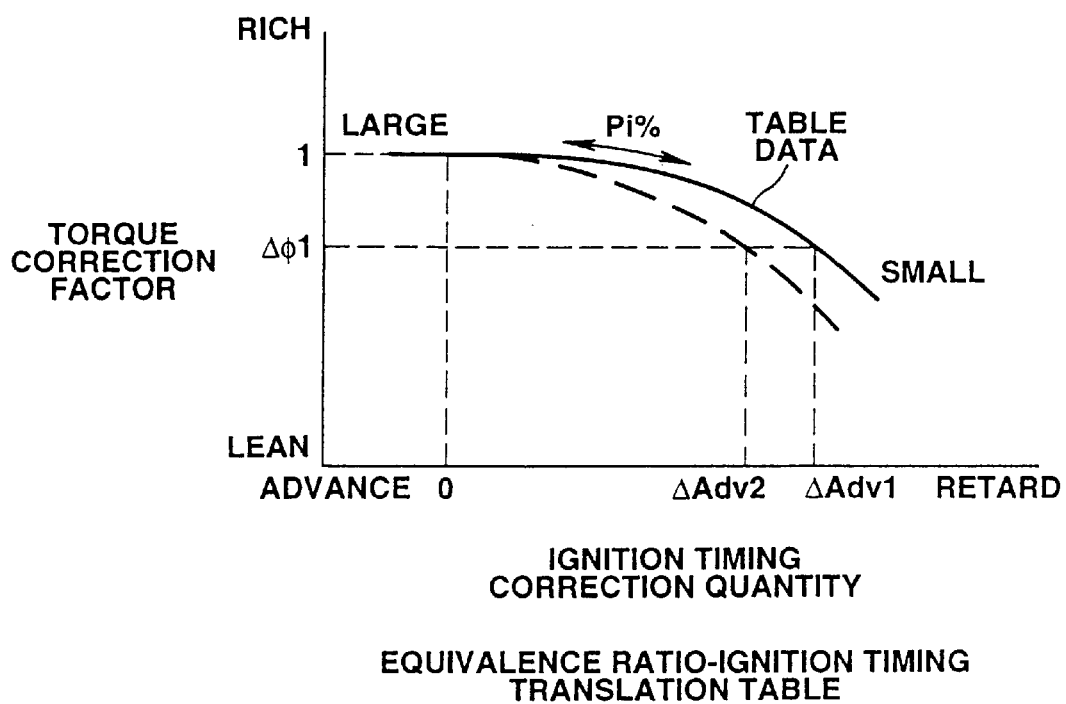
FIG. 25 is a graph illustrating an equivalence ratio correction factor/ignition timing translation table.
Figure 26:
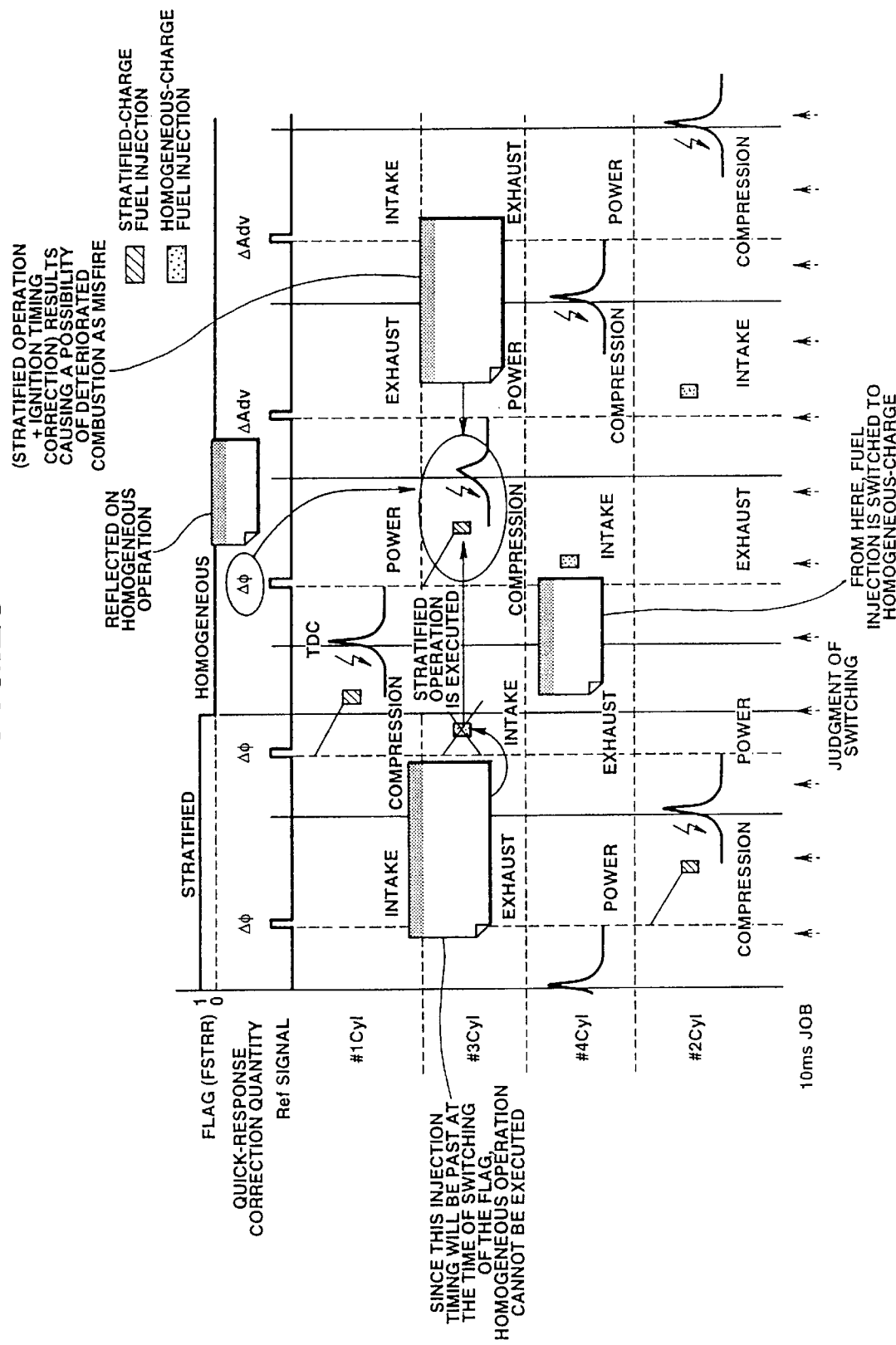
FIG. 26 is a time chart of a torque correction control at the time of switching of a combustion mode from stratified to homogeneous, showing a problem to be solved by the invention.
Figure 27:
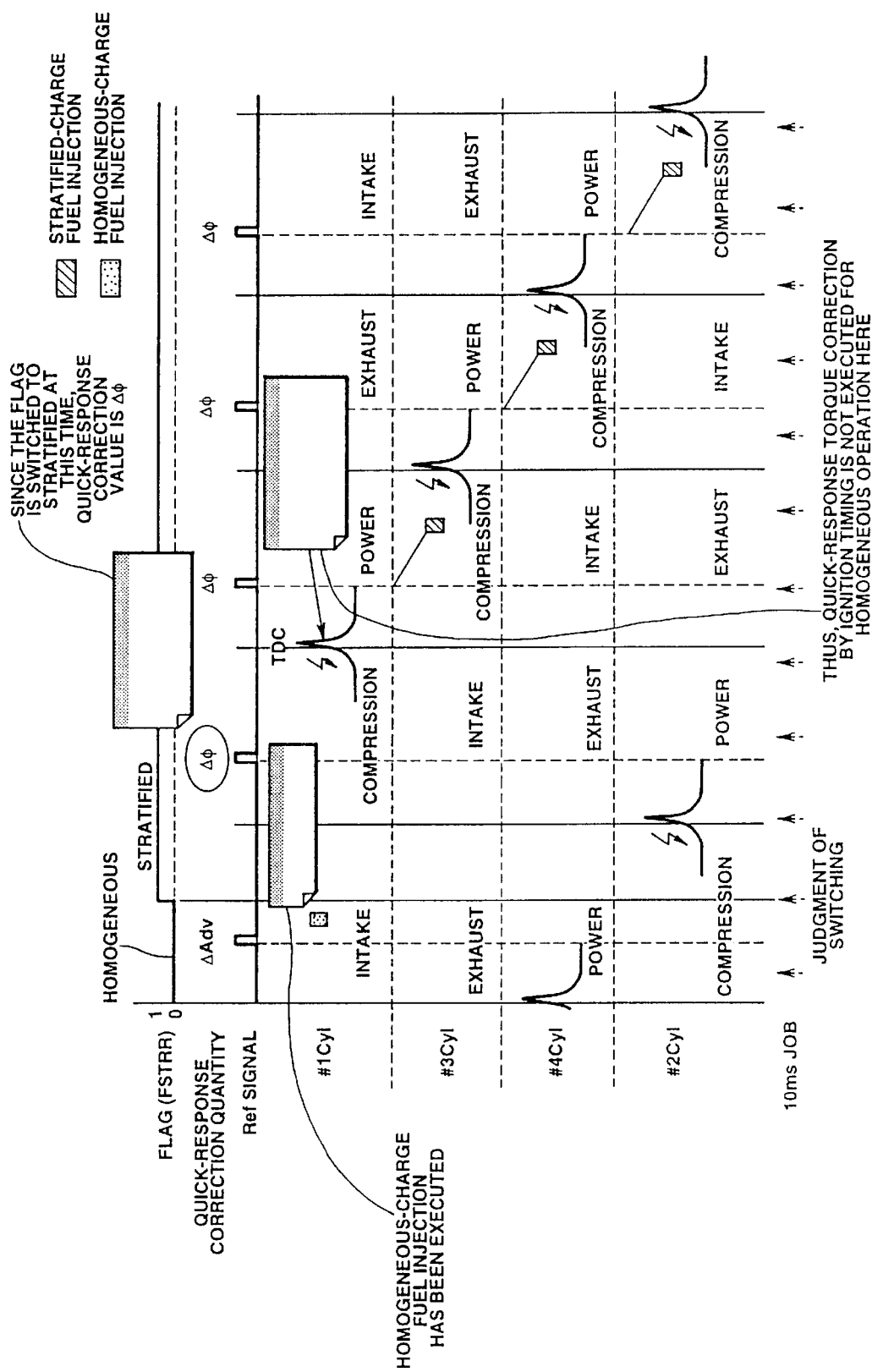
FIG. 27 is a time chart of a torque correction control at the time of switching of a combustion mode from homogeneous to stratified, showing a problem to be solved by the invention.

Referring to FIG. 24, a torque control (torque correction) according to the eighth embodiment of the present invention will be described. In this embodiment, a predetermined time is set to be sufficiently longer as compared with the time from request of the quick response torque correction till finish of that correction, and the torque correction by the equivalence ratio correction factor Δφ0 is continued even when switching to homogeneous operation takes place during the predetermined time.

Specifically, when it is judged at step S101 that the combustion mode is homogeneous, the control proceeds to step S131 where it is judged whether it is the time just after request of torque correction or not. In case it is the time just after request of torque correction, the control proceeds to step S132 where the value of the counter N for measurement of time is reset to "0". Thereafter, at step S104 the torque correction factor PIPER is read, at step S133 the equivalence ratio correction factor $\Delta \phi 0$ is calculated, and at step S105 the equivalence ratio correction factor $\Delta \phi 0$ is stored for used as a predetermined variable, whereby to execute the torque correction by the equivalence ratio correction.

Then, it is judged at step S134 whether the value of the above described counter N becomes a predetermined value Nset or not. In case of no, it is determined that there is a possibility that the torque correction has not yet been finished, so at step S135 the flag FADJHN is set to "1" and thereafter at step S136 increment of the value of the counter N is carried out. Further, in case it is judged at step S134 that the value of the counter N becomes the predetermined value Nset, it is determined that a sufficient time has lapsed to allow the torque correction to be finished,and at step S137 and step S138 the flag FADJHN and the counter N are reset to t"0" in sequence.

What is claimed is:

1. An internal combustion engine, comprising:
   a first cylinder;
   a second cylinder; and
   a controller, said controller including:
     a mode requesting section for requesting one of a first combustion mode and a second combustion mode for each of the cylinders, the second combustion mode being later in a fuel injection timing than the first combustion mode;
     a mode judging section for judging whether an actual combustion mode of each of the cylinders is the first combustion mode or the second combustion mode;
     a torque correction requesting section for generating a torque correction request signal for a torque correction according to operation of the engine; and
     a torque correction section for performing torque correction for each of the cylinders, in response to the torque correction request signal and to the actual combustion mode of each of the cylinders, by manipulating either a first manipulated variable in the first combustion mode or a second manipulated variable in the second combustion mode.

2. The engine as claimed in claim 1, further comprising:
   a plurality of injectors each connected to the associated cylinders, respectively and injecting fuel into the first and second cylinders; and
   wherein the controller further comprises a flag setting section for setting a flag when one of the injectors injects fuel into one of the cylinders at a timing according to the first combustion mode; and
   wherein the mode judging section judges the combustion mode according to the flag.

3. The engine as claimed in claim 2, wherein the flag setting section resets the flag after the timing of fuel injection according to the second combustion mode.

4. The engine as claimed in claim 1, further comprising:
   a plurality of injectors each disposed to the first and second cylinders, respectively and injecting fuel into the first and second cylinders;
   wherein the mode judging section judges that one of the cylinders is in the first combustion mode when the mode requesting section requests the first combustion mode at the timing of fuel injection by the injectors according to the first combustion mode, and judges that the one of the cylinders is in the second combustion mode when the mode requesting section requests the second combustion mode at the timing of fuel injection by the injectors according to the first combustion mode.

5. The engine as claimed in claim 4, wherein
   the combustion is performed in the first cylinder and followed by the second cylinder, and
   wherein the mode judging section judges that the second cylinder is in the second combustion mode when the first cylinder performs combustion according to the second combustion mode under a condition where the mode requesting section requests the second combustion mode.

6. The engine as claimed in claim 4, wherein
   the mode judging section judges that the second cylinder is in the second combustion mode when a period from the request of the mode requesting section for switching from the second combustion mode to the first combustion mode through the timing of the fuel injection into the first cylinder according to the second combustion mode is shorter than a period between the timings of fuel injection into the second cylinder according to the first combustion mode and into the first cylinder according to the second combustion mode; and
   wherein the mode judging section judges that the second cylinder is in the first combustion mode when the period from the request of the mode requesting section for switching from the second combustion mode to the first combustion mode through the timing of the fuel injection into the first cylinder according to the second combustion mode is longer than the period between the timings of fuel injection into the second cylinder according to the first combustion mode and into the first cylinder according to the second combustion mode.

7. The engine as claimed in claim 4, wherein
   the mode judging section judges that the second cylinder is in the first combustion mode when the mode requesting section keeps requesting the first combustion mode during the period between the timings of the injection into the first cylinder and into the second cylinder both according to the first combustion mode, and
   wherein the mode judging section judges that the second cylinder is in the second combustion mode when the mode requesting section requests to switch from the first combustion mode to the second combustion mode during the period between the timings of the injection into the first cylinder and into the second cylinder both according to the first combustion mode.

8. The engine as claimed in claim 4, wherein
   the mode judging section judges that the second cylinder is in the second combustion mode when the mode requesting section keeps requesting the second combustion mode during the period between the timings of the injection into the first cylinder and into the second cylinder both according to the first combustion mode, and
   wherein the mode judging section judges that the second cylinder is in the first combustion mode when the mode requesting section requests to switch from the second combustion mode to the first combustion mode during the period between the timings of the injection into the first cylinder and into the second cylinder both according to the first combustion mode.

9. The engine as defined in claim 1, wherein the first combustion mode is homogeneous charge combustion, and the second combustion mode is stratified charge combustion.

10. The engine as claimed in claim 1, wherein the manipulated variable for torque correction in the first combustion mode comprises at least an ignition spark timing, and the manipulated variable for torque correction in said second combustion mode comprises a rate of fuel and air.

11. The engine as claimed in claim 1, further comprising a plurality of injectors each disposed to the associated cylinders, respectively, and injecting the fuel directly into the first and second cylinders.

12. A control system for an internal combustion engine having a plurality of cylinders, comprising:
   a mode requesting section for requesting one of a first combustion mode and a second combustion mode for each of the cylinders, the second combustion mode being later in a fuel injection timing than the first combustion mode;
   a mode judging section for judging whether an actual combustion mode of each of the cylinders is the first combustion mode or the second combustion mode;
   a torque correction requesting section for generating a torque correction request signal for a torque correction according to operation of the engine; and
   a torque correction section for performing torque correction for each of the cylinders, in response to the torque correction request signal and to the actual combustion mode of each of the cylinders, by manipulating either a first manipulated variable in the first combustion mode or a second manipulated variable in the second combustion mode.

13. A control method for an internal combustion engine having a plurality of cylinders, comprising:
   requesting one of a first combustion mode and a second combustion mode for each of the cylinders, the second combustion mode being later in a fuel injection timing than the first combustion mode;
   judging whether an actual combustion mode of each of the cylinders is the first combustion mode or the second combustion mode;
   requesting a torque correction according to operation of the engine; and
   performing torque correction for each of the cylinders, in response to the torque correction request signal and to the actual combustion mode of each of the cylinders, by manipulating either a first manipulated variable in the first combustion mode or a second manipulated variable in the second combustion mode.

14. A control method for an internal combustion engine, comprising:
   selecting one of a first combustion mode and a second combustion mode for each of a plurality of cylinders, the second combustion mode being later in a fuel injection timing than the first combustion mode;
   requesting a torque correction according to operation of the engine;
   selecting a manipulated variable according to whether a combustion mode is changed from the first combustion mode to the second combustion mode or from the second combustion mode to the first combustion mode; and
   performing torque correction for each of the cylinders, in response to the torque correction request signal and to the manipulated variable selected by the variable selecting section.

* * * * *